(12) United States Patent
Rastogi et al.

(10) Patent No.: US 11,887,167 B2
(45) Date of Patent: Jan. 30, 2024

(54) UTILIZING MACHINE LEARNING MODELS TO GENERATE AN OPTIMIZED DIGITAL MARKETING SIMULATION

(71) Applicant: Accenture Global Solutions Limited, Dublin (IE)

(72) Inventors: Keshav Rastogi, Gurgaon Haryana (IN); Amitava Dey, New Delhi (IN); Lakshay Chhabra, New Delhi (IN); Sanjay S. Sharma, New Delhi (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 17/806,816

(22) Filed: Jun. 14, 2022

(65) Prior Publication Data

US 2023/0401607 A1     Dec. 14, 2023

(51) Int. Cl.
*G06Q 30/00*     (2023.01)
*G06Q 30/0241*   (2023.01)

(52) U.S. Cl.
CPC .............................. *G06Q 30/0276* (2013.01)

(58) Field of Classification Search
None
See application file for complete search history.

(56) References Cited

U.S. PATENT DOCUMENTS

| | | | |
|---|---|---|---|
| 9,922,340 B1 * | 3/2018 | Vaver ................. | G06Q 30/0242 |
| 11,062,360 B1 * | 7/2021 | Donamukkala ........ | G06N 20/00 |
| 2013/0339126 A1 * | 12/2013 | Cui ........................ | G06Q 30/02 |
| | | | 705/14.41 |
| 2014/0046777 A1 * | 2/2014 | Markey .................. | G06Q 30/02 |
| | | | 705/14.66 |
| 2017/0345048 A1 * | 11/2017 | Schnabl ............. | G06Q 30/0256 |
| 2018/0308124 A1 * | 10/2018 | Gao ........................ | G06N 20/20 |
| 2019/0087469 A1 * | 3/2019 | Zhang ................. | G06F 16/2465 |

(Continued)

FOREIGN PATENT DOCUMENTS

| WO | WO-2016000212 A1 * | 1/2016 | ............. G06N 20/00 |
|---|---|---|---|
| WO | WO-2019055065 A1 * | 3/2019 | ........... G06F 16/244 |

OTHER PUBLICATIONS

Dzyabura, Daria, and Hema Yoganarasimhan. "Machine learning and marketing." Handbook of marketing analytics. Edward Elgar Publishing, 2018. 255-279. (Year: 2018).*

(Continued)

*Primary Examiner* — Michael Bekerman
(74) *Attorney, Agent, or Firm* — Harrity & Harrity, LLP

(57) ABSTRACT

A device may receive and transform metric data and share of voice data, associated with digital marketing by an entity, into transformed data, may generate model data from the transformed data, and may divide the model data into training data, test data, and validation data. The device may train models, with the training data, to generate training results, and may process the test data, with the models, to generate test results. The device may process the validation data, with the models, to generate validation results, and may select a first model, a second model, and a third model based on the results. The device may utilize the first model to predict a share of voice, and may utilize the second model to predict a click through rate. The device may utilize the third model to predict a conversion rate, and may perform actions based on the predicted data.

20 Claims, 14 Drawing Sheets

(56) References Cited

U.S. PATENT DOCUMENTS

| | | | |
|---|---|---|---|
| 2019/0180255 A1* | 6/2019 | Deshpande | G06Q 20/227 |
| 2019/0251593 A1* | 8/2019 | Allouche | G06Q 10/0639 |
| 2020/0401886 A1* | 12/2020 | Deng | G06N 3/08 |
| 2021/0110411 A1* | 4/2021 | Pollak | G06N 20/00 |
| 2021/0365981 A1* | 11/2021 | Janakiraman | G06Q 30/0204 |

OTHER PUBLICATIONS

Cui, Geng, Man Leung Wong, and Hon-Kwong Lui. "Machine learning for direct marketing response models: Bayesian networks with evolutionary programming." Management Science 52.4 (2006): 597-612. (Year: 2006).*

Mintz, Ofer, et al. "The right metrics for marketing-mix decisions." International Journal of Research in Marketing 38.1 (2021): 32-49. (Year: 2021).*

Ankam, Divya, and Nizar Bouguila. "Generalized Dirichlet Regression and other Compositional Models with Application to Marketshare Data Mining of Information Technology Companies." ICEIS (1). 2019. (Year: 2019).*

* cited by examiner

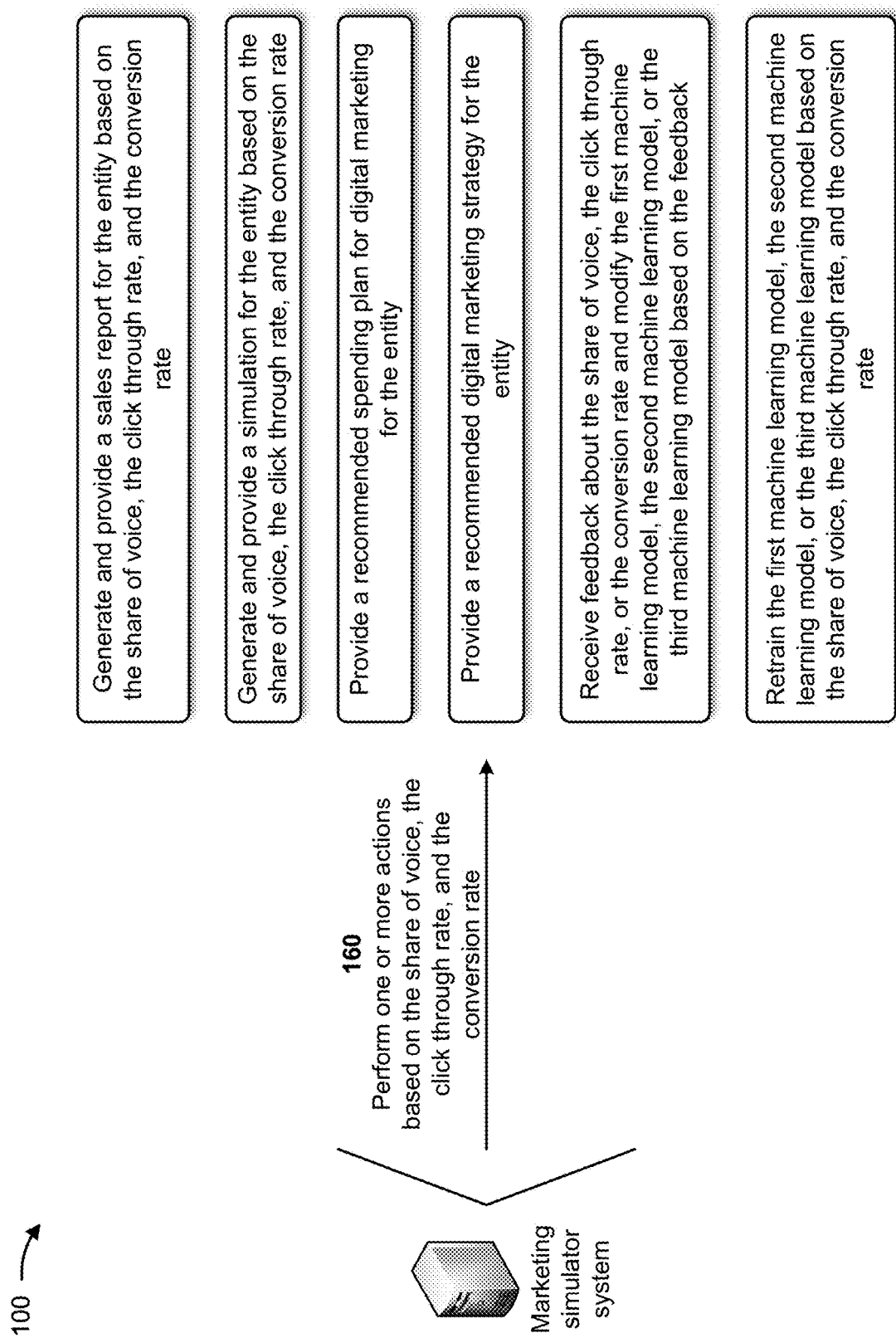

UTILIZING MACHINE LEARNING MODELS TO GENERATE AN OPTIMIZED DIGITAL MARKETING SIMULATION

BACKGROUND

Digital marketing includes marketing of products and/or services or advertising delivered through digital channels, such as search engines, websites, social media, email, mobile applications, and/or the like. Advertisement slots for marketing are provided by publishers and advertisers place bids for these advertisement slots. The bidding process may involve programmatic advertising.

SUMMARY

Some implementations described herein relate to a method. The method may include receiving metric data and share of voice data associated with digital marketing by an entity, and transforming the metric data and the share of voice data into transformed data. The method may include performing exploratory data analysis techniques on the transformed data to generate model data, and dividing the model data into training data, test data, and validation data. The method may include training a plurality of machine learning models, with the training data, to generate training results, and processing the test data, with the plurality of machine learning models, to generate test results. The method may include processing the validation data, with the plurality of machine learning models, to generate validation results, and selecting, from the plurality of machine learning models, a first machine learning model, a second machine learning model, and a third machine learning model based on the training results, the test results, and the validation results. The method may include utilizing the first machine learning model to predict a share of voice for the entity, and utilizing the second machine learning model to predict a click through rate for the entity. The method may include utilizing the third machine learning model to predict a conversion rate for the entity, and performing one or more actions based on the share of voice, the click through rate, and the conversion rate.

Some implementations described herein relate to a device. The device may include one or more memories and one or more processors coupled to the one or more memories. The one or more processors may be configured to receive metric data and share of voice data associated with digital marketing by an entity, and utilize a data cleaning technique, a feature extraction technique, and a scaling technique to transform the metric data and the share of voice data into transformed data. The one or more processors may be configured to perform exploratory data analysis techniques on the transformed data to generate model data, and divide the model data into training data, test data, and validation data. The one or more processors may be configured to train a plurality of machine learning models, with the training data, to generate training results, and process the test data, with the plurality of machine learning models, to generate test results. The one or more processors may be configured to process the validation data, with the plurality of machine learning models, to generate validation results, and select, from the plurality of machine learning models, a first machine learning model, a second machine learning model, and a third machine learning model based on the training results, the test results, and the validation results. The one or more processors may be configured to utilize the second machine learning model to predict a click through rate for the entity, and utilize the third machine learning model to predict a conversion rate for the entity. The one or more processors may be configured to perform one or more actions based on the share of voice, the click through rate, and the conversion rate.

Some implementations described herein relate to a non-transitory computer-readable medium that stores a set of instructions for a device. The set of instructions, when executed by one or more processors of the device, may cause the device to receive metric data and share of voice data associated with digital marketing by an entity, and transform the metric data and the share of voice data into transformed data. The set of instructions, when executed by one or more processors of the device, may cause the device to perform a univariate and bivariate analysis technique, a hypothesis testing technique, and a correlation analysis technique on the transformed data to generate model data, and divide the model data into training data, test data, and validation data. The set of instructions, when executed by one or more processors of the device, may cause the device to train a plurality of machine learning models, with the training data, to generate training results, and process the test data, with the plurality of machine learning models, to generate test results. The set of instructions, when executed by one or more processors of the device, may cause the device to process the validation data, with the plurality of machine learning models, to generate validation results, and select, from the plurality of machine learning models, a first machine learning model, a second machine learning model, and a third machine learning model based on the training results, the test results, and the validation results. The set of instructions, when executed by one or more processors of the device, may cause the device to utilize the first machine learning model to predict a share of voice for the entity, and utilize the second machine learning model to predict a click through rate for the entity. The set of instructions, when executed by one or more processors of the device, may cause the device to utilize the third machine learning model to predict a conversion rate for the entity, and perform one or more actions based on the share of voice, the click through rate, and the conversion rate.

BRIEF DESCRIPTION OF THE DRAWINGS

FIGS. 1A-1J are diagrams of an example implementation described herein.

DETAILED DESCRIPTION

Figure 1A:
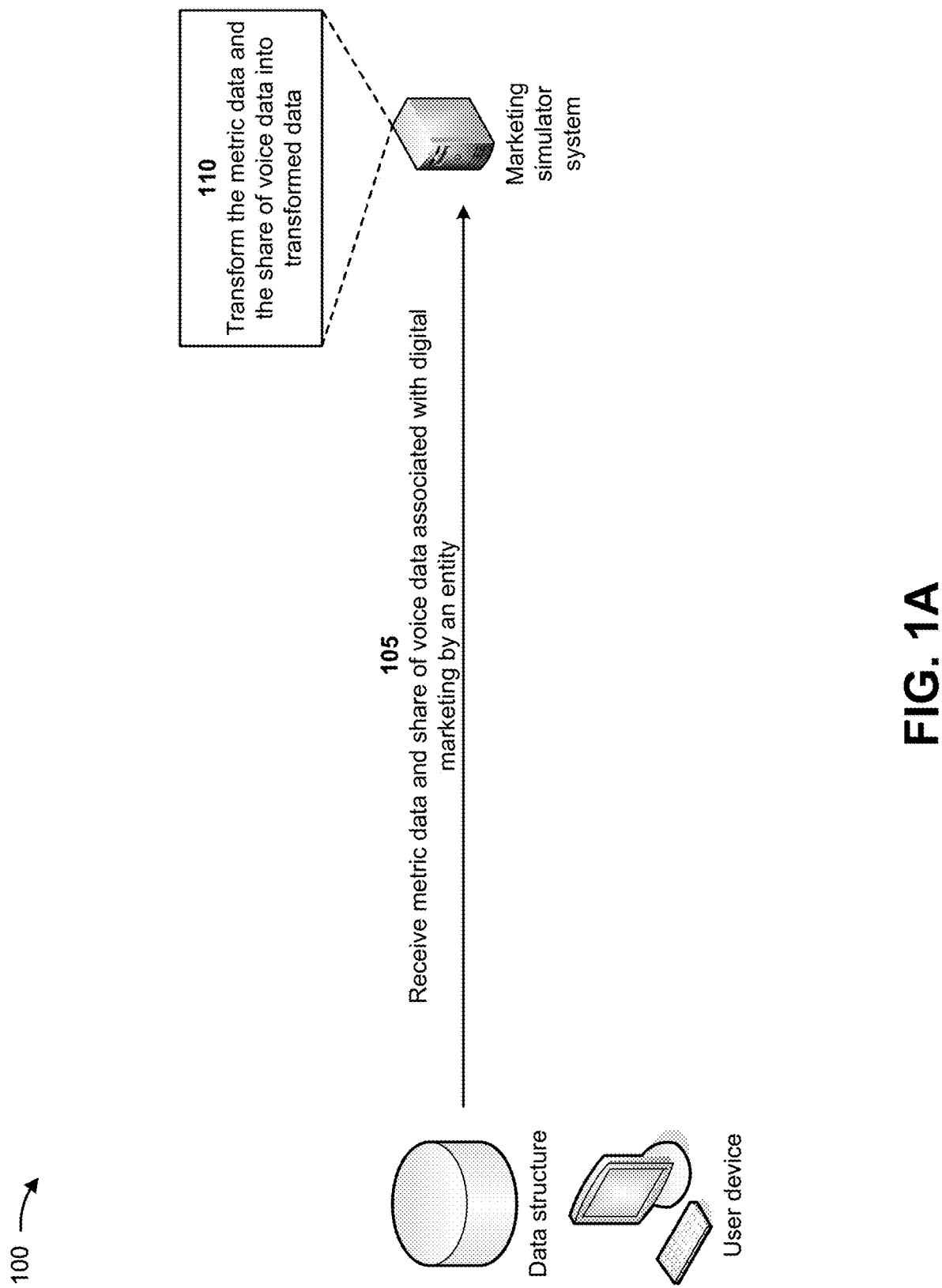

The following detailed description of example implementations refers to the accompanying drawings. The same reference numbers in different drawings may identify the same or similar elements.

Programmatic advertising involves buying advertising space automatically based on bids that are placed by advertisers on publisher websites. There are multiple advertisers and the advertiser with a greatest bid for an advertisement slot wins the bid. Advertisements of the winning advertiser may be shown in the slot, and the winning advertiser may be charged the agreed upon bid price. Specialists in marketing effectiveness want to determine an optimized price to offer as a bid for an advertisement. For example, an entity may wish to plan for offering product and/or service advertisements on a search engine based on search terms. However, such a marketing campaign may be performed based on business knowledge and heuristics, which is a time consuming and tedious process. Many times, the marketing specialists incorrectly predict the optimized price to offer as a bid for an advertisement.

Therefore, current techniques for determining digital marketing consume computing resources (e.g., processing resources, memory resources, communication resources, and/or the like), networking resources, and/or the like associated with utilizing disparate heuristics and subjective business knowledge to incorrectly predict the optimized price to offer as a bid for an advertisement, overpaying for an advertisement due to incorrectly predicting the optimized price, displaying advertisements that are not effective due to incorrectly predicting the optimized price, generating a marketing campaign that is ineffective due to utilizing disparate heuristics and subjective business knowledge, and/or the like.

Some implementations described herein relate to a marketing simulator system that utilizes machine learning models to generate an optimized digital marketing simulation. For example, the marketing simulator system may receive metric data and share of voice data associated with digital marketing by an entity, and may transform the metric data and the share of voice data into transformed data. The marketing simulator system may perform exploratory data analysis techniques on the transformed data to generate model data, and may divide the model data into training data, test data, and validation data. The marketing simulator system may train a plurality of machine learning models, with the training data, to generate training results, and may process the test data, with the plurality of machine learning models, to generate test results. The marketing simulator system may process the validation data, with the plurality of machine learning models, to generate validation results, and may select, from the plurality of machine learning models, a first machine learning model, a second machine learning model, and a third machine learning model based on the training results, the test results, and the validation results. The marketing simulator system may utilize the first machine learning model to predict a share of voice for the entity, and may utilize the second machine learning model to predict a click through rate for the entity. The marketing simulator system may utilize the third machine learning model to predict a conversion rate for the entity, and may perform one or more actions based on the share of voice, the click through rate, and the conversion rate.

In this way, the marketing simulator system utilizes machine learning models to generate an optimized digital marketing simulation. The marketing simulator system may be utilized in a digital marketing environment to generate an optimized spend plan for a digital marketing campaign. The marketing simulator system may provide improved digital marketing planning, execution of multiple what-if scenarios, predictions for share of voice, click through rates, clicks, impressions, units sold, sales, and/or the like. This, in turn, conserves computing resources, networking resources, and/or the like that would otherwise have been consumed in utilizing disparate heuristics and subjective business knowledge to incorrectly predict the optimized price to offer as a bid for an advertisement, overpaying for an advertisement due to incorrectly predicting the optimized price, displaying advertisements that are not effective due to incorrectly predicting the optimized price, generating a marketing campaign that is ineffective due to utilizing disparate heuristics and subjective business knowledge, and/or the like.

FIGS. 1A-1J are diagrams of an example 100 associated with utilizing machine learning models to generate an optimized digital marketing simulation. As shown in FIGS. 1A-1J, example 100 includes an marketing simulator system associated with a user device and a data structure. The marketing simulator system may include a system that utilizes machine learning models to generate an optimized digital marketing simulation. Further details of the marketing simulator system, the user device, and the data structure are provided elsewhere herein.

As shown in FIG. 1A, and by reference number 105, the marketing simulator system may receive metric data and share of voice data associated with digital marketing by an entity. For example, the user device and/or the data structure may store the metric data and/or the share of voice data associated with the digital marketing by the entity. The marketing simulator system may periodically receive the metric data and/or the share of voice data from the user device and/or the data structure, may continuously receive the metric data and/or the share of voice data from the user device and/or the data structure, may receive the metric data and/or the share of voice data from the user device and/or the data structure based on a request provided to the user device and/or the data structure, and/or the like.

The metric data may be provided at a campaign level, a retailer level, a brand level, a brand form level, a type level, a branded level, a keyword level, a daily level, and/or the like. The metric data may include data identifying quantities spent, impressions, clicks, units sold, total sales, cost per click (CPC), return on advertising spent (ROAS), a campaign name (e.g., a campaign with which a product listing is associated), a brand (e.g., a brand name of the entity), a brand form (e.g., a brand name of the entity), a type (e.g., a keyword search type), whether the brand name is stated while searching, a retailer (e.g., a retailer (the entity) on which the search is conducted), a proxy keyword (e.g., a keyword used while conducting the search), a period (e.g., a year of search), a date (e.g., a date on which the search is conducted), an average CPC (e.g., a cost per click value derived from quantities spent and clicks), a quantity spent (e.g., a cost incurred while performing a click), impressions (e.g., a quantity of impressions published by the entity), clicks (e.g., a quantity of clicks made by a user), a quantity of units sold, total sales (e.g., total sales during a purchase), ROAS (e.g., derived from quantity spent and total sales), and/or the like.

The share of voice data may be provided at a retailer level, a brand level, a sub brand level, a keyword level, a weekly level, and/or the like. The share of voice data may include data identifying a manufacturer of a product, a brand name of the entity, a sub brand name of the entity, a keyword used while conducting a search, a retailer on which a search is conducted, a week in which a share of voice is calculated, a share of voice metric for a different brand, retailer, and/or keyword at a week level, and/or the like. In some implementations, granularities of the metric data and the share of voice data may be different (e.g., the metric data may be provided at a daily level and the share of voice data may be provided at a weekly level). In such implementations, the marketing simulator system may change the granularity of the share of voice data to a daily level.

In some implementations, the marketing simulator system may include additional data with the metric data and/or the share of voice data. The additional data may include external data identifying public holidays (e.g., a list that identifies public holidays in a time period), mass events (e.g., a black Friday or a Christmas variable to identify an effect of mass events on a retailer site), web search trends (e.g., a website that analyzes a popularity of top search queries across various regions and languages), seasonal patterns, trend patterns, and/or the like. The additional data may include time series variables, such as a month start, a month end, a week start, an end of a week, a day of the week, a day of the month, and/or the like. The additional data may include derived data, such as data identifying a cost per click, a return on advertising spent, a click through rate, a price, a discount, and/or the like.

As further shown in FIG. 1A, and by reference number 110, the marketing simulator system may transform the metric data and the share of voice data into transformed data. For example, when transforming the metric data and the share of voice data into the transformed data, the marketing simulator system may perform a data cleaning technique on the metric data and the share of voice data to generate clean data, may perform a feature extraction technique on the metric data and the share of voice data to generate feature data, may perform a scaling technique on the metric data and the share of voice data to generate scaled data, and/or the like. The clean data, the feature data, and the scaled data may correspond to the transformed data.

The data cleaning technique may include creating an analytical data set at a brand level, a retailer level, a keyword level, and a daily level; replacing data that includes a same name for a brand and a sub brand with the brand name; calculating averages for duplicate share of voice values after removing share of voice values equal to zero; removing sub brand data; removing metric data where a proxy keyword is missing; aggregating the metric data at the brand, retailer, and keyword levels when no duplicates are present at campaign name, brand, retailer, and keyword levels in the metric data; merging the metric data and the share of voice data at a brand level, a retailer level, and a keyword level by creating a mapping file that standardizes keywords that are different in the metric data and the share of voice data; utilizing a group mean imputation strategy to generate missing data in the metric data and the share of voice data; performing an outlier analysis on the metric data and the share of voice data; and/or the like.

The feature extraction technique may include calculating derived variables based on raw variables available in the metric data and the share of voice data. The derived variables may include CPC (e.g., total spend divided by total clicks), ROAS (e.g., total sales divided by total spend), a click through rate (CTR) (e.g., total clicks divided by total impressions), a price per unit or discount (e.g., total sales divided by total units sold), a conversion rate (e.g., units sold divided by total clicks), a month end or a weekend, a share of voice moving average (e.g., over days, a week, and/or the like), a CTR moving average (e.g., over days, a week, and/or the like), a stock value before a major sale event, and/or the like. The derived variables may provide a further explanation of and more confidence in the raw variables.

The scaling technique (e.g., a feature scaling technique) may include a standard scalar scaling technique that standardizes features by removing a mean and scaling to a unit variance. In some implementations, the standard scalar scaling technique may utilize a standard scalar function for feature scaling (e.g., $z=(x-u)/s$; where u is a mean of training samples and s is a standard deviation of the training samples).

Figure 1B:
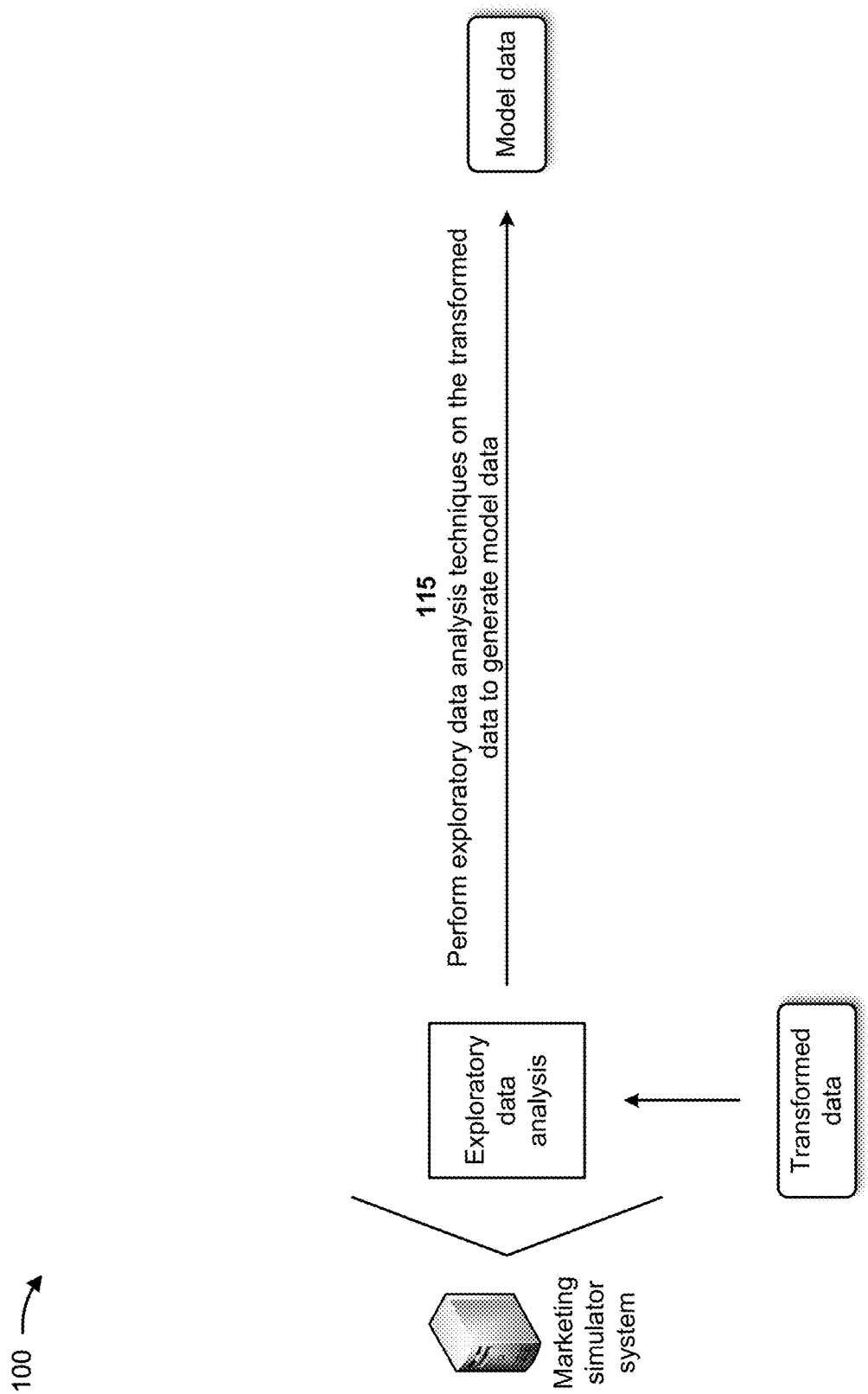

As shown in FIG. 1B, and by reference number 115, the marketing simulator system may perform exploratory data analysis techniques on the transformed data to generate model data. For example, when performing the exploratory data analysis techniques on the transformed data to generate the model data, the marketing simulator system may perform a univariate and bivariate analysis technique on the transformed data to generate a first portion of the model data, may perform a hypothesis testing technique on the transformed data to generate a second portion of the model data, may perform a correlation analysis technique on the transformed data to generate a third portion of the model data. In some implementations, after generating the transformed data, the marketing simulator system may perform the exploratory data analysis techniques on the transformed data to identify patterns, relationships, strength of relationship, and/or the like in the metric data and the share of voice data combined at both weekly and daily levels.

The univariate and bivariate analysis technique may include summarizing and identifying patterns in the transformed data. For example, the univariate and bivariate analysis technique may include analyzing patterns shown in clicks and impressions over a period of time and identifying a consistency in these patterns. The univariate and bivariate analysis technique may also include identifying a variation of the click through rate over a time period (e.g., due to seasonality and behavior over the time period). The hypothesis testing technique may include establishing a relationship between different variables (e.g., raw variables and derived variables). Different hypotheses may be framed based on the different variables and p-values may be utilized to prove the hypotheses valid or invalid. For example, for a scenario that includes a brand (e.g., brand B), a retailer (e.g., retailer A), and a keyword (e.g., word C), the hypothesis testing technique may generate the following hypotheses and conclusions:

| Number | Hypothesis | Conclusion |
| --- | --- | --- |
| 1 | Clicks and click through rate have a positive relationship | Valid |
| 2 | Units sold and click through rate have a positive relationship | Valid |
| 3 | Spend and click through rate have a positive relationship | Valid |

The hypothesis testing technique may test a validity of a hypothesis based on the Spearman correlation coefficient and statistical significance (e.g., a p-value). The correlation analysis technique may include analyzing a strength of relationship among continuous variables based on a Spearman correlation analysis and scatter plots.

Figure 1C:
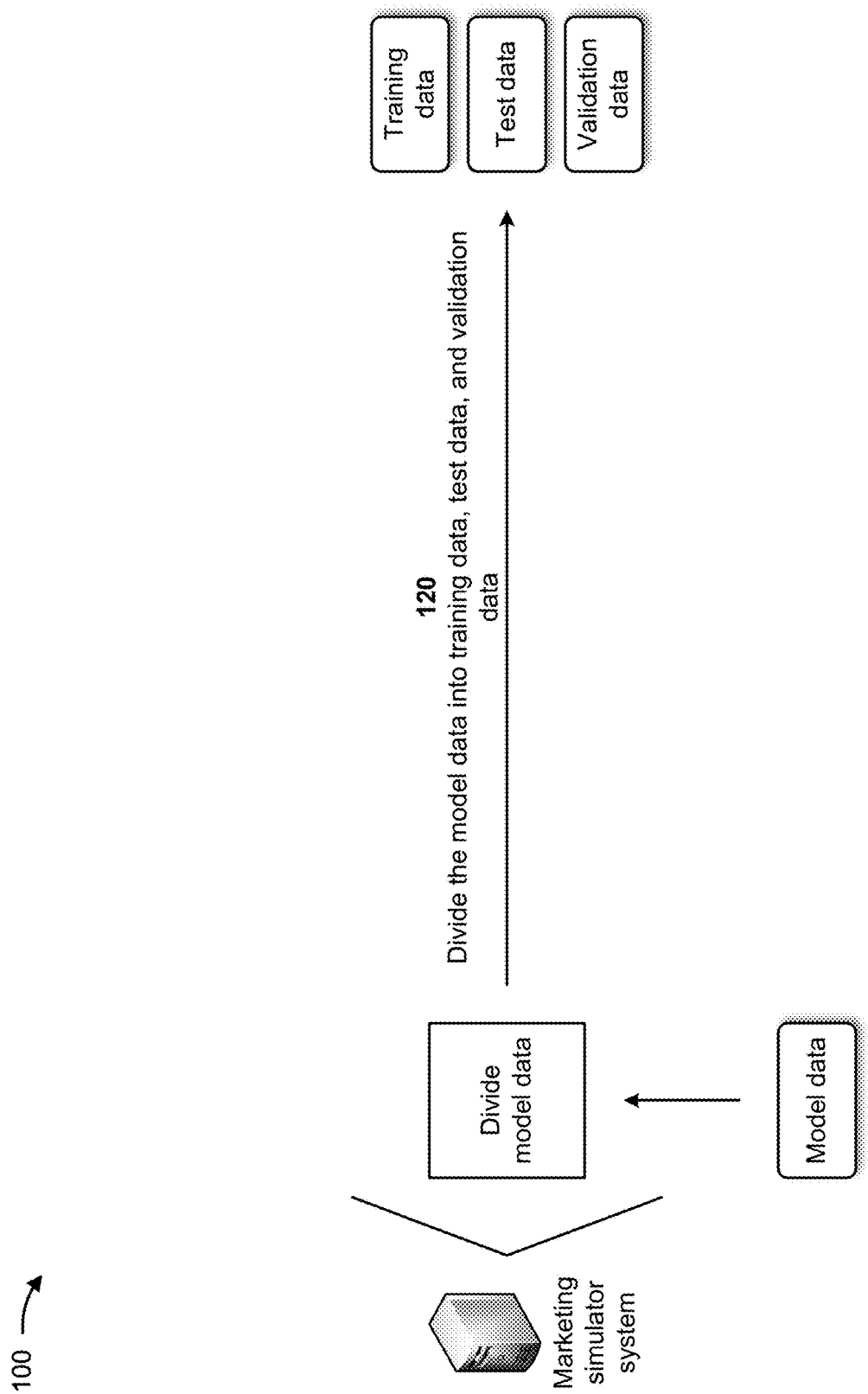

As shown in FIG. 1C, and by reference number 120, the marketing simulator system may divide the model data into training data, test data, and validation data. For example, the marketing simulator system may divide the model data into a first portion of model data, a second portion of model data, and a third portion of model data. The first portion, the second portion, and the third portion may include a same quantity of the model data, different quantities of the model data, and/or the like. In some implementations, more of the model data may be allotted to the first portion of model data since the first portion may be utilized to generate the training data for machine learning models.

The marketing simulator system may generate the training data for the machine learning models based on the first portion of model data. The marketing simulator system may generate the test data for the machine learning models based on the second portion of model data. The marketing simulator system may generate validation data for the machine learning models based on the third portion of model data. In other implementations, the marketing simulator system may utilize different portions of the model data to generate the training data, the test data, and/or the validation data for the machine learning models.

The marketing simulator system may train the machine learning models with the training data to generate trained machine learning models. As described elsewhere herein, the machine learning models may be trained to process the model data and predict a share of voice, a click through rate, and a conversion rate for the entity. In some implementations, rather than training the machine learning models, the marketing simulator system may obtain the trained machine learning models from another system or device that trained the machine learning models. In this case, the marketing simulator system may provide the other system or device with the training data, the test data, and/or the validation data for use in training the machine learning models, and may provide the other system or device with updated training, test, and/or validation data to retrain the machine learning models in order to update the machine learning models. Further details of the machine learning models are provided elsewhere herein.

In some implementations, the marketing simulator system may train the machine learning models with the training data to generate the trained machine learning model, and may process the validation data, with the trained machine learning models, to validate that the trained machine learning models is operating correctly. If the trained machine learning models are operating correctly, the marketing simulator system may process the trained machine learning models, with the test data, to further ensure that the trained machine learning models are operating correctly. A trained machine learning model can be said to be operating correctly if it has adequate accuracy, has adequate precision, has adequate recall, is not subject to excessive overfitting, and/or the like. If a trained machine learning model is operating excessively incorrect, the marketing simulator system may modify the trained machine learning model and may revalidate and/or retest the modified machine learning model based on the validation data and/or the test data.

Figure 1D:
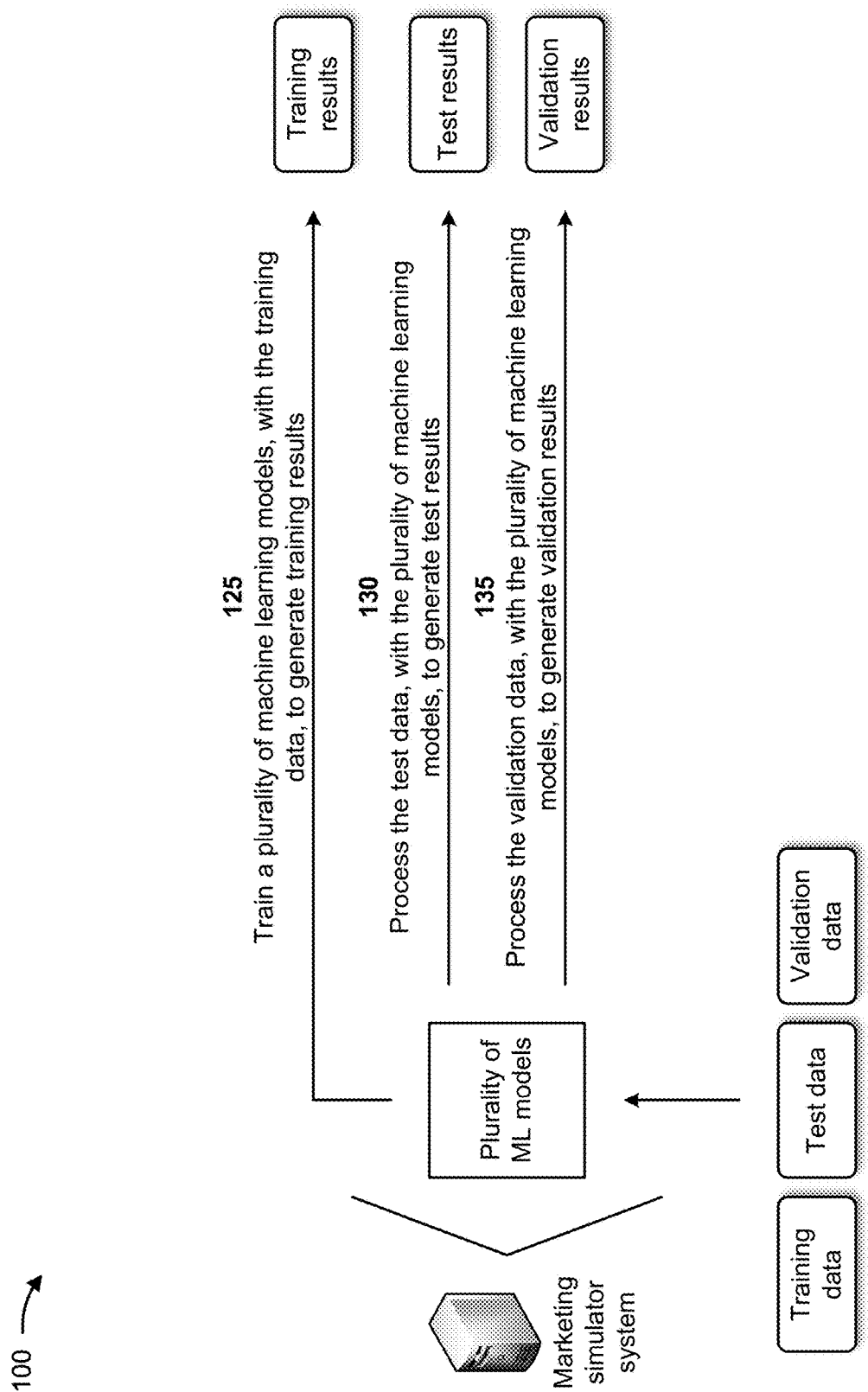

As shown in FIG. 1D, and by reference number 125, the marketing simulator system may train a plurality of machine learning models, with the training data, to generate training results. For example, the plurality of machine learning models may include one or more of a random forest machine learning model, an extreme gradient boosting regressor machine learning model, a prophet machine learning model, a linear regression machine learning model, a gradient boost machine learning model, an adaptive boosting regressor machine learning model, a k-nearest neighbors (KNN) machine learning model. The random forest machine learning model may provide an ensemble learning method for classification, regression, and other tasks by constructing a multitude of decision trees at training time. For classification tasks, an output of the random forest machine learning model is a class selected by most of the decision trees. For regression tasks, a mean or an average prediction of individual decision trees may be output by the random forest machine learning model.

The extreme gradient boosting regressor (XGBoost) machine learning model may be computationally efficient (e.g., execute quickly) and highly effective (e.g., good model performance). The prophet machine learning model may forecast time series data based on an additive model where non-linear trends are fit with yearly, weekly, and daily seasonality, plus holiday effects. The prophet machine learning model may accommodate different data granularities (e.g., hourly, daily, weekly) and may be robust to missing observations or large outliers. The prophet machine learning model may generalize well with trends that have non-linear growth curves, where a trend satisfies a natural limit. It is well explained by equation. The prophet machine learning model may utilize the following calculation: $y(t)=g(t)+s(t)+h(t)+f(t)+e(t)$, where $y(t)$ corresponds to an addictive regressive model, $g(t)$ corresponds a trend factor, $s(t)$ corresponds to a seasonality component, $h(t)$ corresponds to a holiday component, $f(t)$ corresponds to additional regressors, and $e(t)$ corresponds to an error term.

The linear regression machine learning model may provide a linear approach for modeling a relationship between a scalar response and one or more explanatory variables (e.g., dependent and independent variables). For a single explanatory variable, the linear regression machine learning model may perform a simple linear regression. For multiple explanatory variables, the linear regression machine learning model may perform a multiple linear regression. The gradient boost machine learning model (e.g., with gradient-boosted decision trees) may be utilized when a decision tree is the weak learner (e.g., and may outperform the random forest machine learning model). The gradient boost machine learning model may be built in a stage-wise fashion, but may generalize other boosting methods by allowing optimization of an arbitrary differentiable loss function.

The adaptive boosting regressor (AdaBoost) machine learning model may be used in conjunction with many other types of machine learning models to improve performance. The adaptive boosting regressor machine learning model may combine outputs of the other machine learning models (e.g., weak learners) into a weighted sum that represents a final output. The adaptive boosting regressor machine learning model may be adaptive in a sense that subsequent weak learners may be tweaked in favor of instances misclassified by previous classifiers. The KNN machine learning model may be used for classification and regression. In both cases, an input of the KNN machine learning model includes the k closest training examples in a data set, and an output of the KNN machine learning model may depend on whether the KNN machine learning model is used for classification or regression. In KNN classification, the output may be a class membership. An object may be classified by a plurality vote of neighbors and an object may be assigned to a class most common among k nearest neighbors (e.g., k is a positive integer that is typically small). If k=1, then the object is assigned to a class of that single nearest neighbor. In KNN regression, the output may be a property value for the object. The property value may include an average of the values of k nearest neighbors.

In some implementations, the marketing simulator system may utilize the training data to fit the plurality of machine learning models and to generate the training results. The marketing simulator system may compare the training results to expected values and may modify one or more of the plurality of machine learning models based on the comparison of the training results to the expected values. The marketing simulator system may utilize a k-fold cross validation technique (e.g., a resampling method) that uses different portions of the training data to train the plurality of machine learning models on different iterations. The k-fold cross validation technique may provide estimates how accurately the plurality of machine learning models will perform in practice. In some implementations, the marketing simulator system may utilize a walk forward validation technique that optimizes plurality of machine learning models based on the training data, tests the plurality of machine learning models, and then repeats the process. The walk forward validation technique may prevent the plurality of machine learning models from being overfitted.

As further shown in FIG. 1D, and by reference number 130, the marketing simulator system may process the test data, with the plurality of machine learning models, to generate test results. For example, the marketing simulator system may utilize the test data as inputs to the plurality of machine learning models and to generate the test results. The marketing simulator system may compare the test results to expected values and may modify one or more of the plurality of machine learning models based on the comparison of the test results to the expected values. In some implementations, the marketing simulator system may process the test data, with the plurality of machine learning models, to generate the test results and to further ensure that the plurality of machine learning models are operating correctly.

In some implementations, when processing the test data, with the plurality of machine learning models, to generate the test results, the marketing simulator system may generate predictions based on the processing the test data with the plurality of machine learning models, and may compare the predictions to expected values to generate the test results. In some implementations, when processing the test data, with the plurality of machine learning models, to generate the test results, the marketing simulator system may utilize different portions of the test data to test and train the plurality of machine learning models on different iterations, and may generate the test results based on utilizing the different portions of the test data to test and train the plurality of machine learning models on the different iterations.

As further shown in FIG. 1D, and by reference number 135, the marketing simulator system may process the validation data, with the plurality of machine learning models, to generate validation results. For example, when processing the validation data, with the plurality of machine learning models, to generate the validation results, the marketing simulator system may utilize the k-fold cross-validation technique or the walk forward validation technique to generate the validation results. In some implementations, when processing the validation data, with the plurality of machine learning models, to generate the validation results, the marketing simulator system process the validation data, with the plurality of machine learning models, to calculate root mean square errors, may process the validation data, with the plurality of machine learning models, to calculate R-squared values, may process the validation data, with the plurality of machine learning models, to calculate mean absolute percentage errors. The root mean square errors, the R-squared values, and the mean absolute percentage errors may correspond to the validation results.

The root mean square errors may aggregate magnitudes of the errors in predictions, by the plurality of machine learning models and for various data points, into a single measure of predictive power. The root mean square errors provide a measure of accuracy by comparing forecasting errors of different machine learning models for a particular dataset and not between datasets. The root mean square errors (RMSE) may be calculated as follows: $RMSE = \sqrt{(f-o)^2}$, where f corresponds to forecasts and o corresponds to observed values. The R-squared values are statistics that predict future outcomes, or a testing of an hypotheses, based on other related information. The R-squared values may provide a measure of how well observed outcomes are replicated by the plurality of machine learning models, based on a proportion of total variation of outcomes explained by the plurality of machine learning models. The mean absolute percentage errors (MAPE) may be utilized as a loss function for regression problems and in evaluation of the plurality of machine learning models. The mean absolute percentage errors may be calculated as follows:

$$MAPE = \frac{100\%}{n} \sum_{t=1}^{n} \left| \frac{A_t - F_t}{A_t} \right|,$$

where $A_t$ corresponds to an actual value and $F_t$ corresponds to a forecast value. The absolute value in the ratio may be summed for every forecast value in time and may be divided by a quantity (n) of fitted points.

Figure 1E:
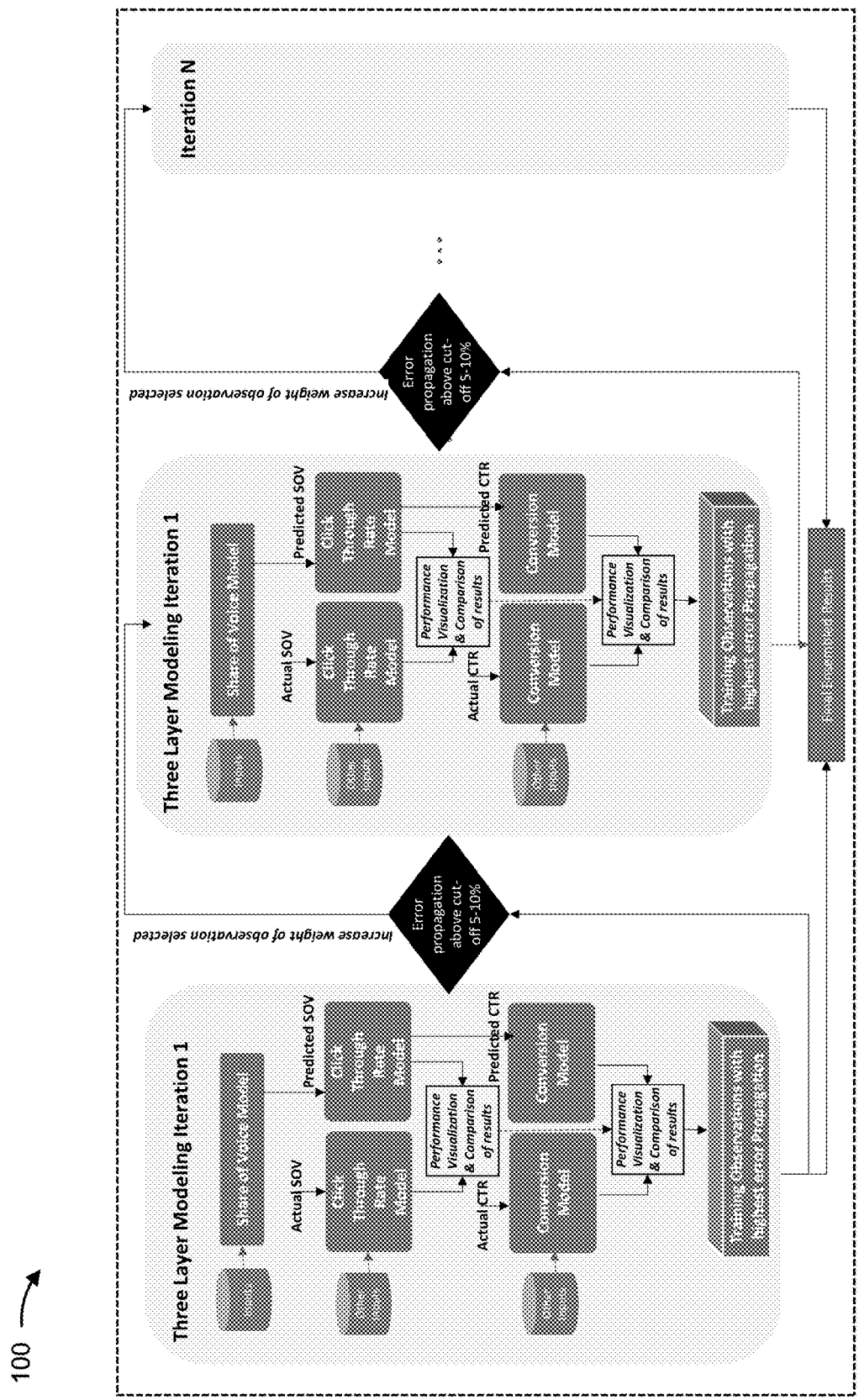

FIG. 1E depicts how the marketing simulator system may minimize model errors propagated through each layer based on a boosting technique across each stacked three layer. For example, a multilayer model (e.g., a plurality of machine learning models) may include error propagation from one layer to another layer. In some implementations, the marketing simulator system may minimize the error propagation between the layers by utilizing the boosting technique across the layers, as shown in FIG. 1E and described below. During training the multilayer model, each layer may self-evaluate all observations associated with an error that is greater than a threshold limit. Observations with greatest errors across the layers may be separated out and more weight may be added to such observations (e.g., repeated a quantity (N) of times). These weighted observations may be combined with randomly-selected observations with less errors and may be passed through three layer architecture again. This process may be repeated a quantity (N) of times (e.g., six to eight) and ensemble results may be taken from the boosted three layer model which may ensure less propagation of errors across the layers. The quantity of iterations may be increased if the quantity of propagated errors is greater than a desired threshold.

Figure 1F:
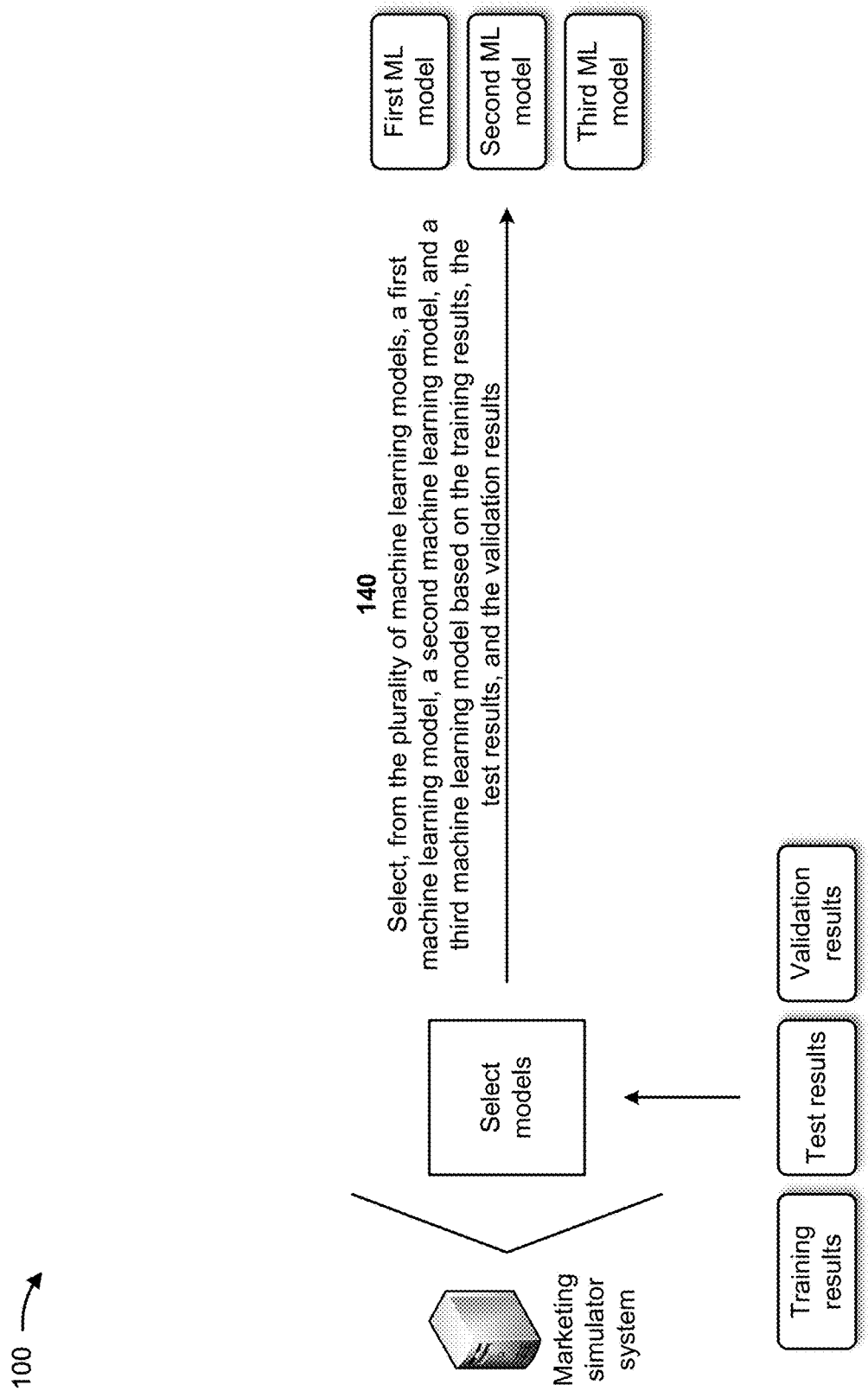

As shown in FIG. 1F, and by reference number 140, the marketing simulator system may select, from the plurality of machine learning models, a first machine learning model, a second machine learning model, and a third machine learning model based on the training results, the test results, and the validation results. For example, when selecting, from the plurality of machine learning models, the first machine learning model, the second machine learning model, and the third machine learning model, the marketing simulator system may select, as the first machine learning model, a best fit one of the plurality of machine learning models to predict a share of voice for the entity, may select, as the second machine learning model, a best fit one of the plurality of machine learning models to predict a click through rate for the entity, and may select, as the third machine learning model, a best fit one of the plurality of machine learning models to predict the conversion rate for the entity.

In some implementations, the marketing simulator system may prepare an analytical data set for input to the plurality of machine learning models. The marketing simulator system may utilize an analytical approach that includes a three-layer framework in which output from a share of voice prediction layer (e.g., a share of voice predicted by the plurality of machine learning models) is fed to a click through rate prediction layer. Output from the click through rate prediction layer (e.g., a click through rate predicted by the plurality of machine learning models) is fed to conversion layer that generates a predicted unit sold quantity. The marketing simulator system may generate an ensemble model that includes the first machine learning model, the second machine learning model, and the third machine learning model. The marketing simulator system may generate the ensemble model from the plurality of machine learning models and based on the test/train split technique, the k-fold cross validation technique, and the walk forward validation technique described above. The marketing simulator system may generate the ensemble model (e.g., select the first machine learning model, the second machine learning model, and the third machine learning model) based on the root mean square errors, the R-squared values, and the mean average percentage errors calculated for the plurality of machine learning models.

Figure 1G:
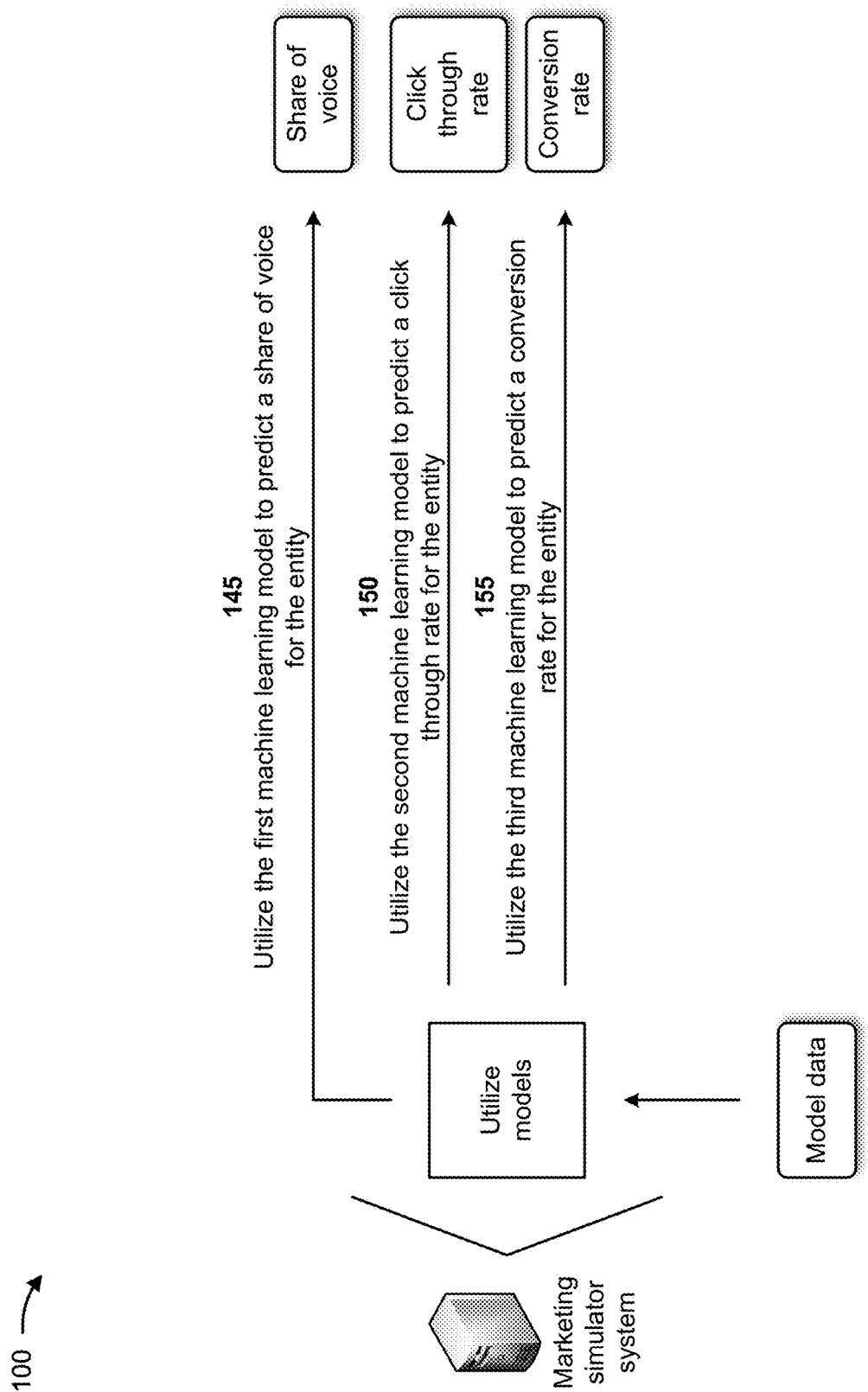

As shown in FIG. 1G, and by reference number 145, the marketing simulator system may utilize the first machine learning model to predict a share of voice for the entity. For example, the marketing simulator system may process the model data, with the first machine learning model, to predict the share of voice for the entity. The share of voice may enable the entity to understand how popular an entity brand is compared to competitors of the entity. In other words, the share of voice provides a measure of a market the entity brand owns, compared to the competitors. Since the share of voice data is available at a weekly level and the metric data is available at a daily level, the marketing simulator system may calculate daily level predictions for the share of voice based on the following analytical equation: $SOVpred=f(SOV_{1week}, SOV_{2\ week}, gt_{pads}, spend, whether_{monthend}, holiday, stockup_{7\ day}, bfriday)$, where $SOV_{pred}$ corresponds to a predicted share of voice at daily level, $SOV_{1week}$ corresponds to a one week moving average derived variable of SOV, $SOV_{2\ week}$ corresponds to a two week moving average derived variable of SOV, spend corresponds to a spend variable controlled by a user, $gt_{pads}$ corresponds to a keyword web search, $whether_{monthend}$ corresponds to a flag indicating whether a particular day signifies month end or not, holiday corresponds to a flag indicating a particular day is a holiday or not, $stockup_{7day}$ corresponds to a seven day moving average for stockup, and bfriday corresponds to a black Friday flag.

As further shown in FIG. 1G, and by reference number 150, the marketing simulator system may utilize the second machine learning model to predict a click through rate for the entity. For example, the marketing simulator system may process the model data, with the second machine learning model, to predict the click through rate for the entity. The CTR may be a powerful metric in a digital marketing campaign, and may include a ratio indicating how often people who see a particular advertisement end up selecting (e.g., clicking on) the advertisement. The click through rate may provide an indication of a percentage of impressions that resulted in a click. A high click through rate may indicate that searchers are finding the advertisement quite relevant. The click through rate may also provide an important measure for defining conversion rates. The marketing simulator system may calculate a predicted click through rate based on the following analytical equation: $CTR_{pred}=f(CTR_{7day}, cpc_{prev}, spend, SOV_{pred}, discount, price, whether_{monthend}, whether_{weekend}, holiday, stock_{7day}, blackfriday_{7day})$, where CTR7 day corresponds to a seven day moving average of click through rate, cpcprev corresponds to a previous day cost per click variable, spend corresponds to spend variable controlled by a user, $SOV_{pred}$ corresponds to a predicted SOV considered as input, discount corresponds to a derived variable (e.g., (base price–price)/base price), price corresponds to a derived variable (e.g., total sales/unit sold), $whether_{monthend}$ corresponds to a flag indicating whether a particular day signifies a month end or not, $whether_{weekend}$ corresponds to a flag indicating whether a particular day signifies a weekend or not, holiday corresponds to a flag indicating whether a particular day is a holiday or not, $stockup_{7day}$ corresponds to a flag variable where seven days post black Friday holds a value of one, and $blackfriday_{7day}$ corresponds to a seven day moving average black Friday flag.

As further shown in FIG. 1G, and by reference number 155, the marketing simulator system may utilize the third machine learning model to predict a conversion rate for the entity. For example, the marketing simulator system may process the model data, with the third machine learning model, to predict the conversion rate for the entity. A conversion may occur when a user of a website completes a desired goal (e.g., purchasing a product and/or service of the entity). The marketing simulator system may calculate a predicted conversion rate (e.g., units sold) based on the following analytical equation: Units sold=f(clicks, discount, $CTR_{pred}$, holiday, $whether_{weekend}$, $whether_{monthend}$, $blackfriday_{7day}$, $stockup_{7day}$), where clicks corresponds to clicks observed as an input, discount corresponds to a derived variable (e.g., (base price –price)/base price), $CTR_{pred}$ corresponds to a predicted click through rate considered as an input, holiday corresponds to a flag indicating whether a particular day is a holiday or not, $whether_{weekend}$ corresponds to a flag indicating whether a particular day is a weekend or not, $whether_{monthend}$ corresponds to a flag indicating whether a particular day signifies a month end or not, $blackfriday_{7day}$ corresponds to a seven day moving average black Friday flag, and $stockup_{7day}$ corresponds to a flag variable where seven days post black Friday holds a value of one.

As shown in FIG. 1H, and by reference number 160, the marketing simulator system may perform one or more actions based on the share of voice, the click through rate, and the conversion rate. In some implementations, performing the one or more actions includes the marketing simulator system generating and providing a sales report for the entity based on the share of voice, the click through rate, and the conversion rate. For example, the marketing simulator system may generate a sales report that includes the share of voice, the click through rate, and the conversion rate, and may provide the sales report to the user device. The user device may display the sales report to a user (e.g., a digital marketing manager) of the user device. Further details of the sales report are provided below in connection with FIG. 1H. In this way, the marketing simulator system conserves computing resources, networking resources, and/or the like that would otherwise have been consumed in generating a marketing campaign that is ineffective due to utilizing disparate heuristics and subjective business knowledge, and/or the like.

In some implementations, performing the one or more actions includes the marketing simulator system generating and providing a simulation for the entity based on the share of voice, the click through rate, and the conversion rate. For example, the marketing simulator system may generate a simulation that includes the share of voice, the click through rate, and the conversion rate, and may provide the simulation to the user device. The user device may display the simulation to the user of the user device. Further details of the simulation are provided below in connection with FIG. 1I. In this way, the marketing simulator system conserves computing resources, networking resources, and/or the like that would otherwise have been consumed in utilizing disparate heuristics and subjective business knowledge to incorrectly predict the optimized price to offer as a bid for an advertisement, and/or the like.

In some implementations, performing the one or more actions includes the marketing simulator system providing a recommended spending plan for digital marketing for the entity. For example, the marketing simulator system may generate the recommended spending plan for digital marketing based on the share of voice, the click through rate, and the conversion rate, and may provide the recommended spending plan to the user device. The user device may display the recommended spending plan to the user of the user device. In this way, the marketing simulator system conserves computing resources, networking resources, and/or the like that would otherwise have been consumed in generating a spending plan for digital marketing that is ineffective due to utilizing disparate heuristics and subjective business knowledge, and/or the like.

In some implementations, performing the one or more actions includes the marketing simulator system providing a recommended digital marketing strategy for the entity. For example, the marketing simulator system may generate the digital marketing strategy based on the share of voice, the click through rate, and the conversion rate, and may provide the digital marketing strategy to the user device. The user device may display the digital marketing strategy to the user of the user device. In this way, the marketing simulator system conserves computing resources, networking resources, and/or the like that would otherwise have been consumed in generating a digital marketing strategy that is ineffective due to utilizing disparate heuristics and subjective business knowledge, and/or the like.

In some implementations, performing the one or more actions includes the marketing simulator system receiving feedback about the share of voice, the click through rate, or the conversion rate and modifying one or more of the first machine learning model, the second machine learning model, or the third machine learning model based on the feedback. For example, the marketing simulator system may provide data identifying the share of voice, the click through rate, and the conversion rate to the user device. The user device may display the data identifying the share of voice, the click through rate, and the conversion rate to the user of the user device. The user may cause the user device to provide the feedback about the share of voice, the click through rate, or the conversion rate to the marketing simulator system. In this way, the marketing simulator system conserves computing resources, networking resources, and/or the like that would otherwise have been consumed in utilizing disparate heuristics and subjective business knowledge to incorrectly predict the optimized price to offer as a bid for an advertisement, overpaying for an advertisement due to incorrectly predicting the optimized price, and/or the like.

In some implementations, performing the one or more actions includes the marketing simulator system retraining the first machine learning model, the second machine learning model, or the third machine learning model based on the share of voice, the click through rate, and the conversion rate. For example, the marketing simulator system may utilize the share of voice, the click through rate, and the conversion rate as additional training data for retraining the first machine learning model, the second machine learning model, or the third machine learning model, thereby increasing the quantity of training data available for training the first machine learning model, the second machine learning model, or the third machine learning model. Accordingly, the marketing simulator system may conserve computing resources associated with identifying, obtaining, and/or generating historical data for training the first machine learning model, the second machine learning model, or the third machine learning model relative to other systems for identifying, obtaining, and/or generating historical data for training machine learning models.

Figure 1I:
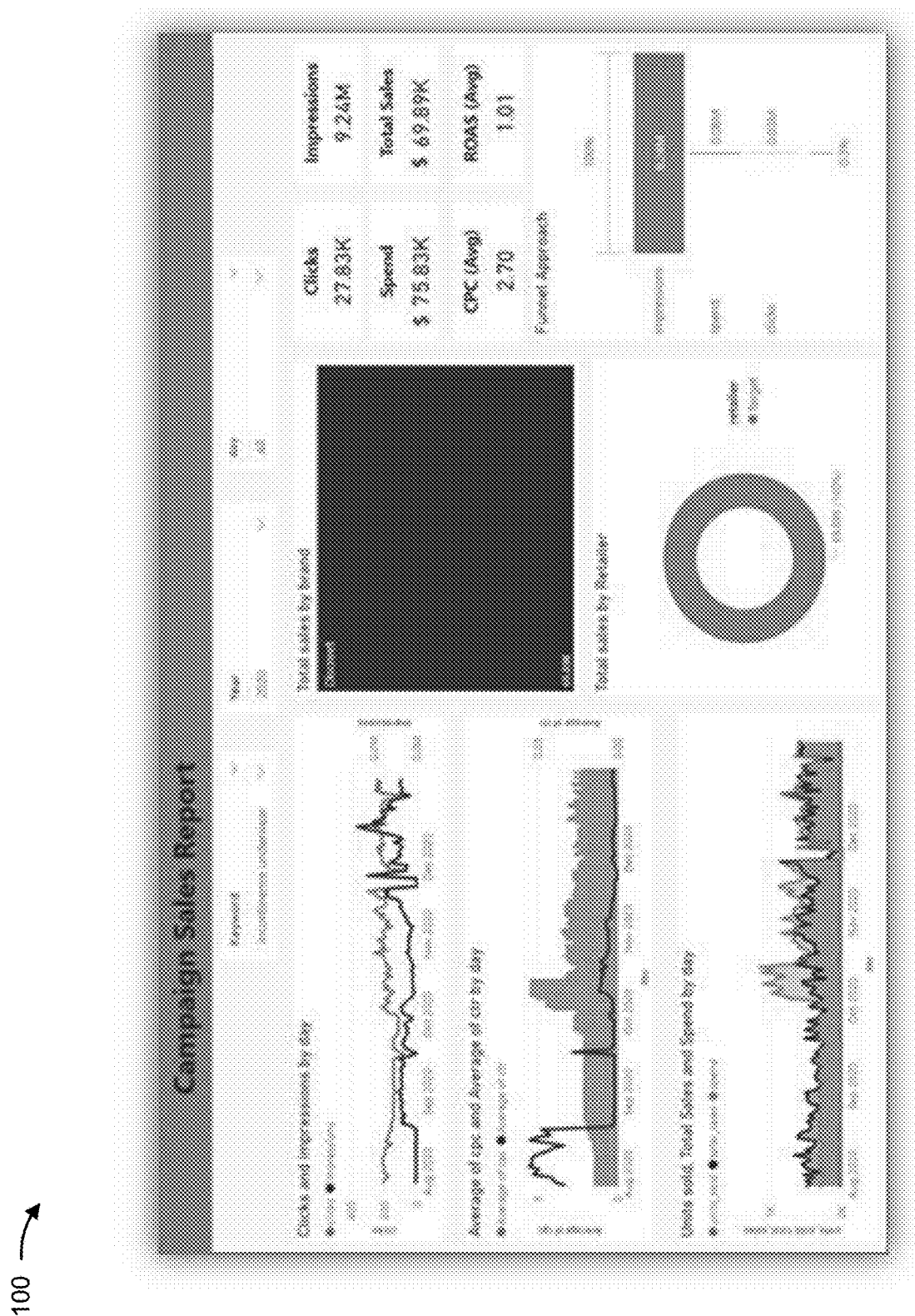

FIG. 1I depicts a sales report that may be generated by the marketing simulator system and displayed to a user of the user device. As shown, the sales report may include a portion identifying clicks and impressions by day; a portion identifying an average CPC and an average click through rate by day; a portion identifying units sold, total sales, and spend by day; a portion identifying total sales by brand; a portion identifying total sales by an entity (e.g., a retailer); a portion identifying clicks, impressions, spend, total sales, CPC, and ROAS; and a portion identifying a funnel approach (e.g., where a total quantity of impressions includes a 100% base of conversion and a quantity of clicks about total impressions provides the click through rate). The sales report may be filtered to provide data insights at a keyword level and/or a time level (e.g., year, month, week, or day).

Figure 1J:
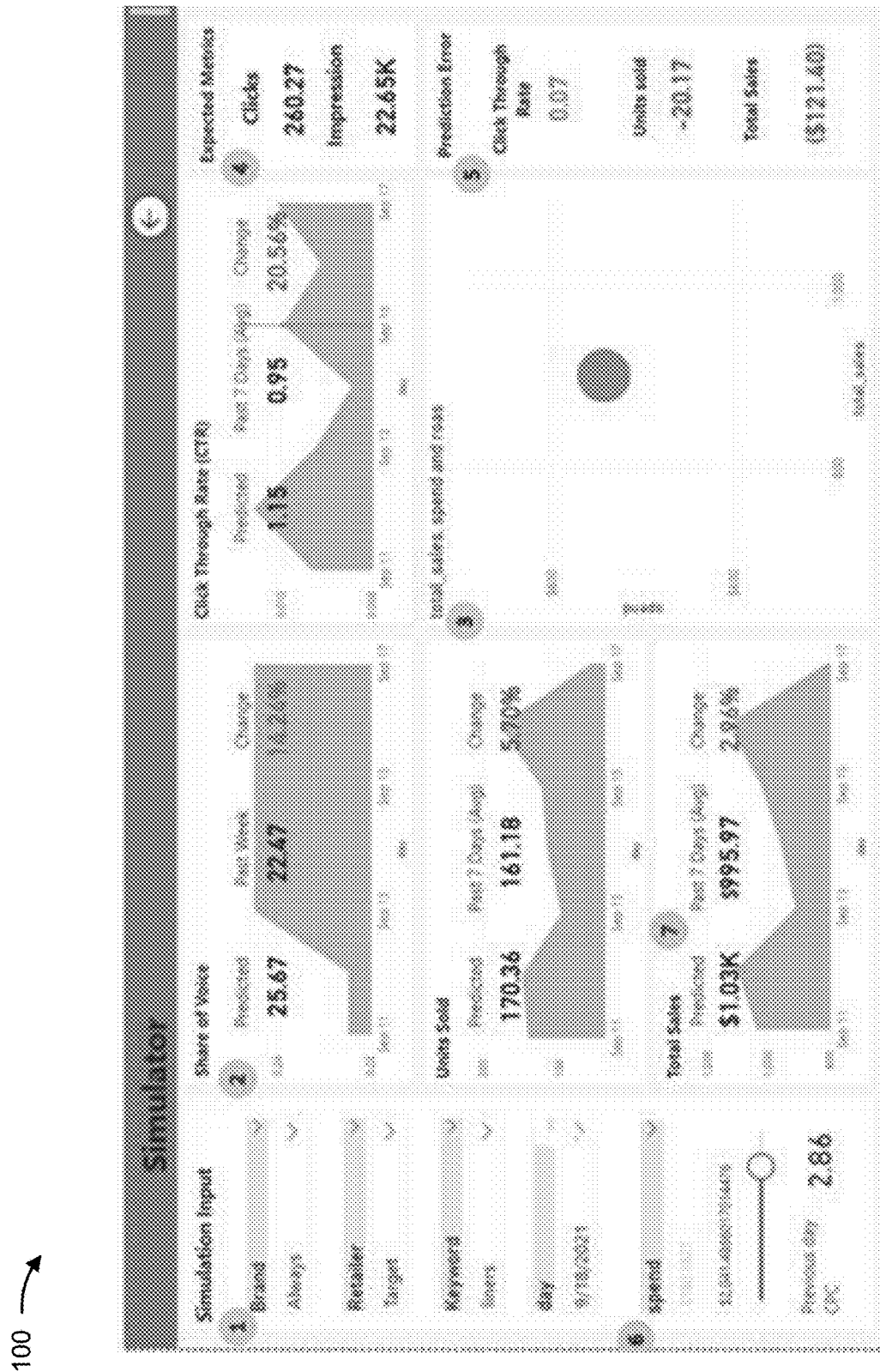

FIG. 1J depicts a simulator that may be generated by the marketing simulator system and displayed to a user of the user device. As shown, the simulator may include a first portion (1) where the user may select inputs, such as brand, keyword, retailer, day and spend, and a second portion (2) that includes predicted values, a past seven day average, and a percent historical change for share of voice, click through rate, units sold, and total sales. The simulator may include a third portion (3) that indicates total sales generated for the spend for the day selected, and a fourth portion (4) that provides expected values for clicks and impressions. The simulator may include a fifth portion (5) that includes absolute prediction errors of click through rates, units sold, and total sold, and a sixth portion (6) where the user may provide inputs, such as spend and discount, to perform what-if simulations. The simulator may include a seventh portion (7) that provides a forecasted next seven day trend for any brand, keyword, and retailer combination at a selected day and/or week.

In this way, the marketing simulator system utilizes machine learning models to generate an optimized digital marketing simulation. The marketing simulator system may be utilized in a digital marketing environment to generate an optimized spend planning for a digital marketing campaign. The marketing simulator system may provide improved digital marketing planning, execution of multiple what-if scenarios, predictions for share of voice, click through rates, clicks, impressions, units sold, sales, and/or the like. This, in turn, conserves computing resources, networking resources, and/or the like that would otherwise have been consumed in utilizing disparate heuristics and subjective business knowledge to incorrectly predict the optimized price to offer as a bid for an advertisement, overpaying for an advertisement due to incorrectly predicting the optimized price, displaying advertisements that are not effective due to incorrectly predicting the optimized price, generating a marketing campaign that is ineffective due to utilizing disparate heuristics and subjective business knowledge, and/or the like.

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices) shown in FIGS. 1A-1J may perform one or more functions described as being performed by another set of devices shown in FIGS. 1A-1J.

Figure 2:
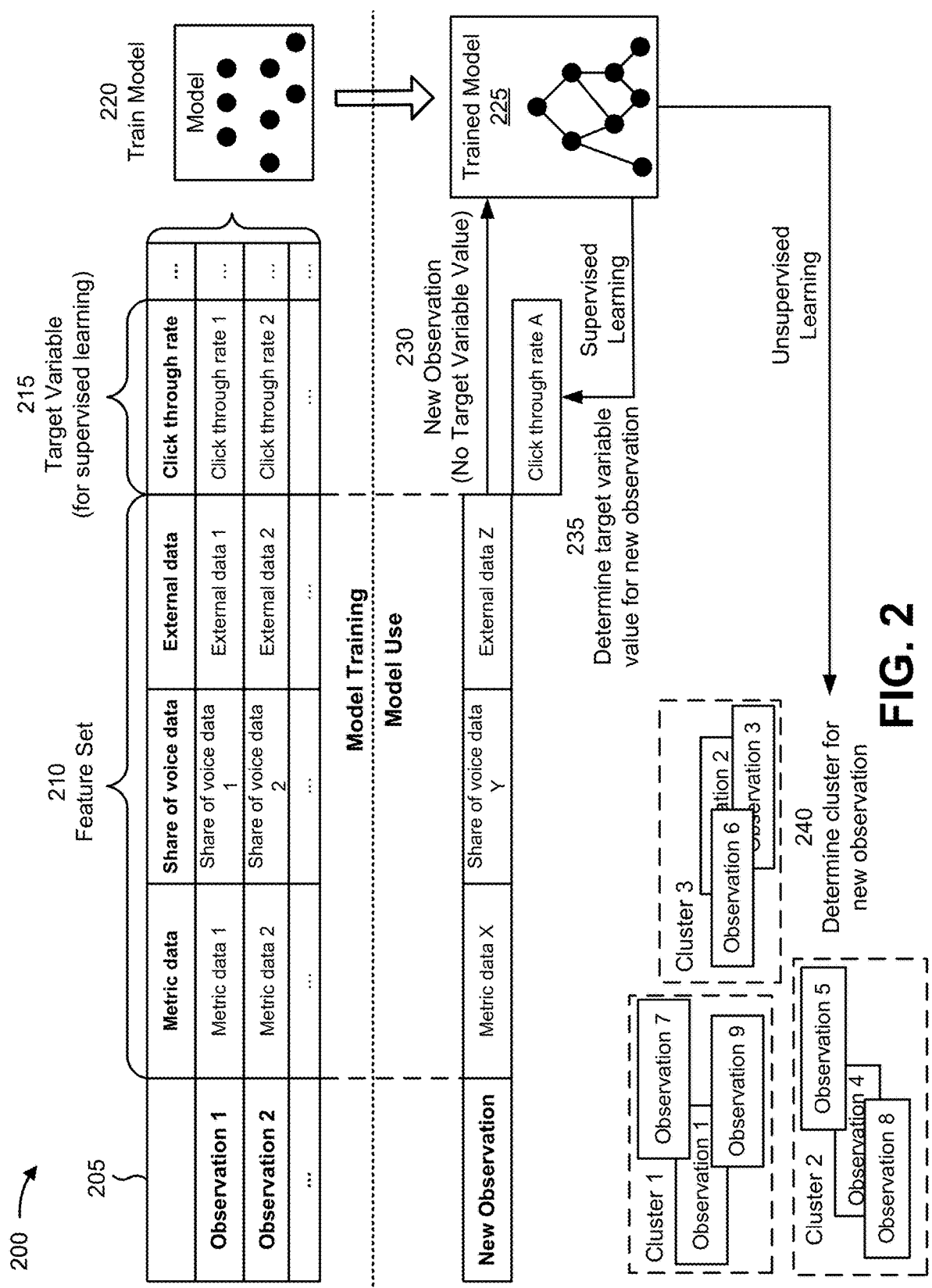
FIG. 2 is a diagram illustrating an example of training and using a machine learning model.

FIG. 2 is a diagram illustrating an example 200 of training and using a machine learning model for generating an optimized digital marketing simulation. The machine learning model training and usage described herein may be performed using a machine learning system. The machine learning system may include or may be included in a computing device, a server, a cloud computing environment, and/or the like, such as the marketing simulator system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the marketing simulator system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the marketing simulator system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of metric data, a second feature of share of voice data, a third feature of external data, and so on. As shown, for a first observation, the first feature may have a value of metric data 1, the second feature may have a value of share of voice 1, the third feature may have a value of external data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be a click through rate and may include a value of click through rate 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of metric data X, a second feature of share of voice data Y, a third feature of external data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of click through rate A for the target variable of the click through rate for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a metric data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a share of voice data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to generate an optimized digital marketing simulation. The machine learning system enables recognition and/or identification of tens, hundreds, thousands, or millions of features and/or feature values for tens, hundreds, thousands, or millions of observations, thereby increasing accuracy and consistency and reducing delay associated with generating an optimized digital marketing simulation relative to requiring computing resources to be allocated for tens, hundreds, or thousands of operators to manually generate an optimized digital marketing simulation.

As indicated above, FIG. 2 is provided as an example. Other examples may differ from what is described in connection with FIG. 2.

Figure 3:
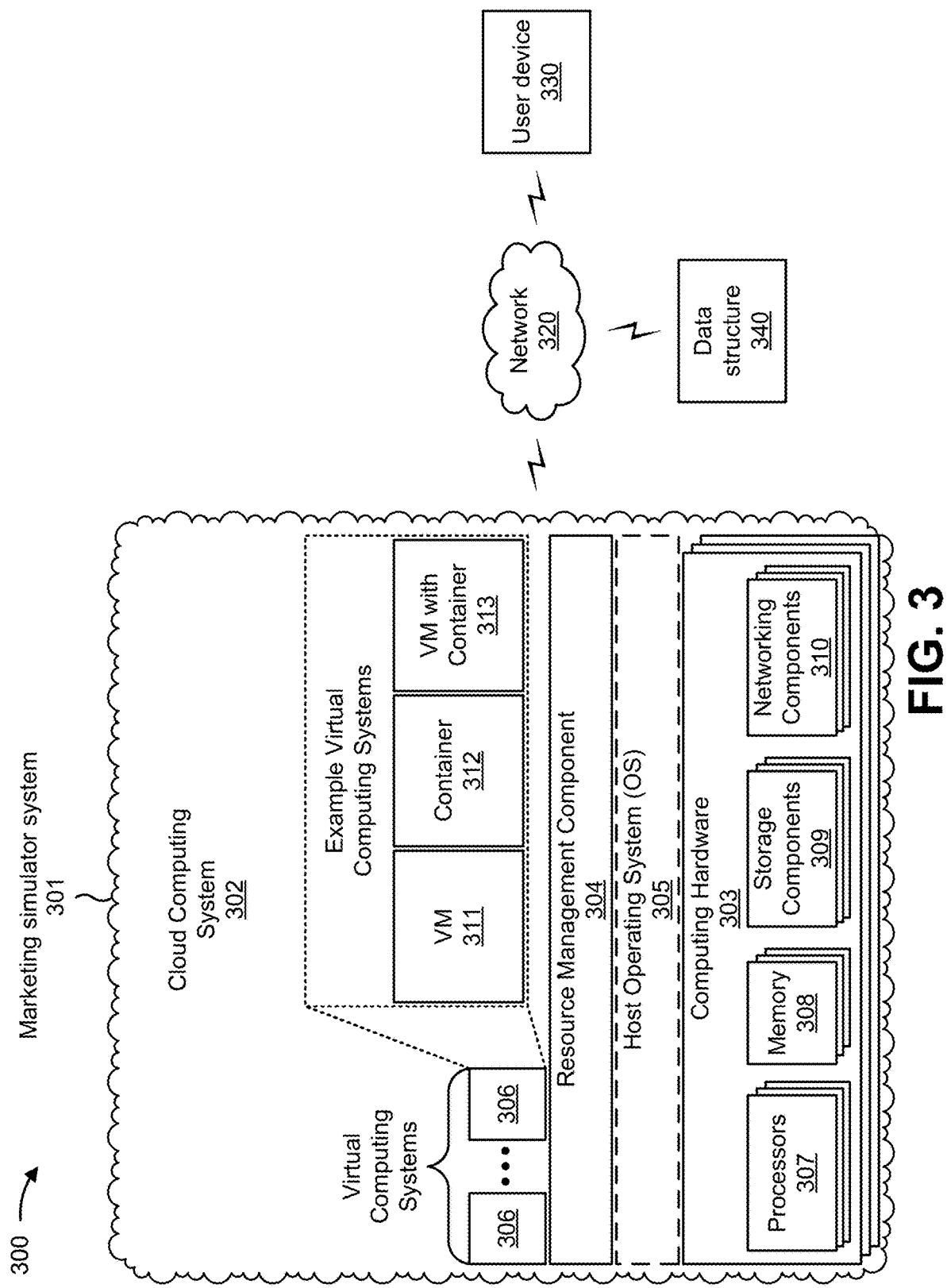
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include an marketing simulator system 301, which may include one or more elements of and/or may execute within a cloud computing system 302. The cloud computing system 302 may include one or more elements 303-313, as described in more detail below. As further shown in FIG. 3, the environment 300 may include a network 320, a user device 330, and/or a data structure 340. Devices and/or elements of the environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of the computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing the computing hardware 303 to start, stop, and/or manage the one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the marketing simulator system 301 may include one or more elements 303-313 of the cloud computing system 302, may execute within the cloud computing system 302, and/or may be hosted within the cloud computing system 302, in some implementations, the marketing simulator system 301 may not be cloud-based (e.g., may be implemented outside of a cloud computing system) or may be partially cloud-based. For example, the marketing simulator system 301 may include one or more devices that are not part of the cloud computing system 302, such as device 400 of FIG. 4, which may include a standalone server or another type of computing device. The marketing simulator system 301 may perform one or more operations and/or processes described in more detail elsewhere herein.

The network 320 includes one or more wired and/or wireless networks. For example, the network 320 may include a cellular network, a public land mobile network (PLMN), a local area network (LAN), a wide area network (WAN), a private network, the Internet, and/or the like, and/or a combination of these or other types of networks. The network 320 enables communication among the devices of the environment 300.

The user device 330 includes one or more devices capable of receiving, generating, storing, processing, and/or providing information, as described elsewhere herein. The user device 330 may include a communication device and/or a computing device. For example, the user device 330 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The data structure 340 includes one or more devices capable of receiving, generating, storing, processing, and/or providing information, as described elsewhere herein. The data structure 340 may include a communication device and/or a computing device. For example, the data structure 340 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The data structure 340 may communicate with one or more other devices of the environment 300, as described elsewhere herein.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
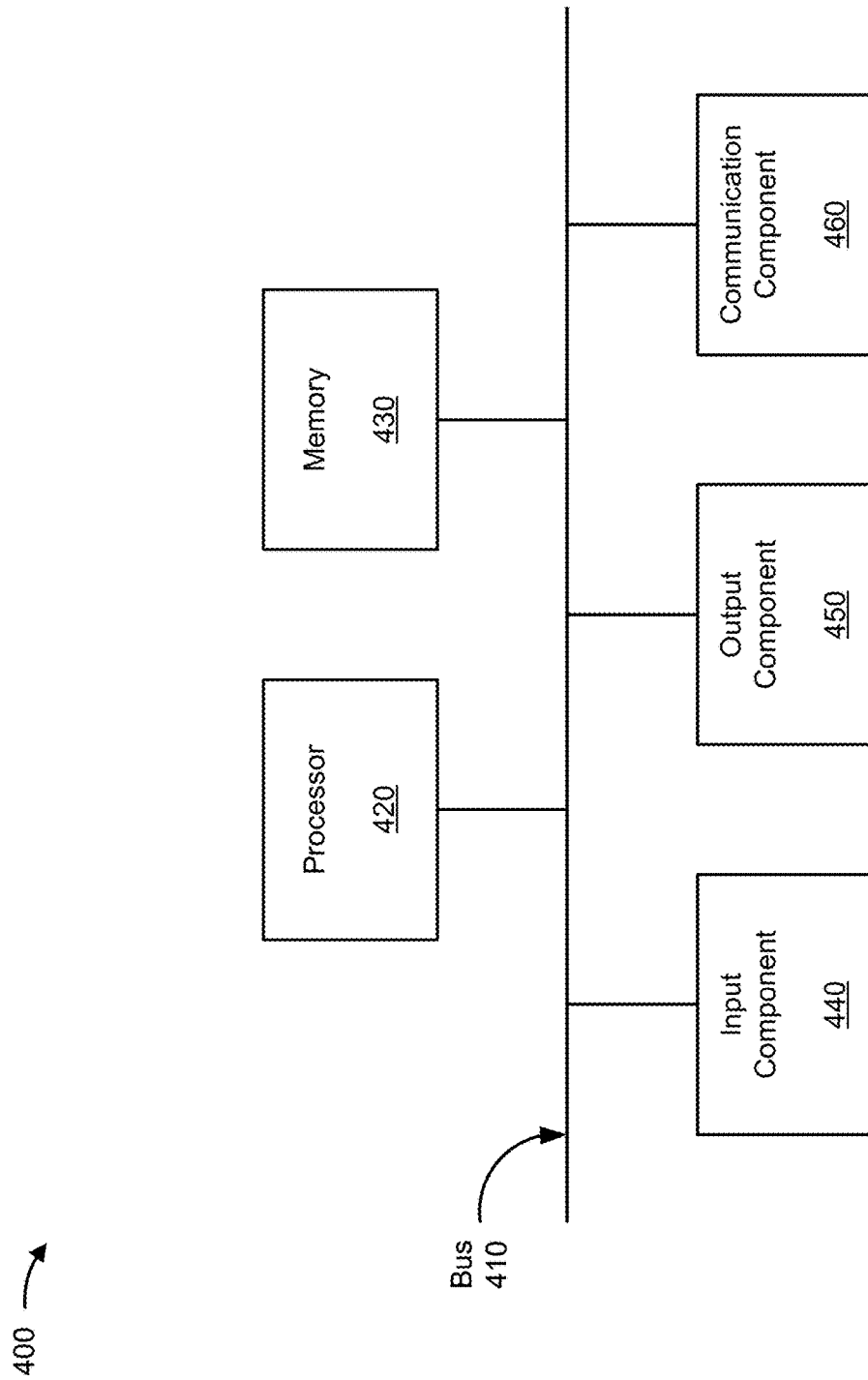
FIG. 4 is a diagram of example components of one or more devices of FIG. 3.

FIG. 4 is a diagram of example components of a device 400, which may correspond to the marketing simulator system 301, the user device 330, and/or the data structure 340. In some implementations, the marketing simulator system 301, the user device 330, and/or the data structure 340 may include one or more devices 400 and/or one or more components of the device 400. As shown in FIG. 4, the device 400 may include a bus 410, a processor 420, a memory 430, an input component 440, an output component 450, and a communication component 460.

The bus 410 includes a component that enables wired and/or wireless communication among the components of device 400. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform a function. The memory 430 includes a random-access memory, a read only memory, and/or another type of memory (e.g., a flash memory, a magnetic memory, and/or an optical memory).

The input component 440 enables the device 400 to receive input, such as user input and/or sensed inputs. For example, the input component 440 may include a touch screen, a keyboard, a keypad, a mouse, a button, a microphone, a switch, a sensor, a global positioning system component, an accelerometer, a gyroscope, an actuator, and/or the like. The output component 450 enables the device 400 to provide output, such as via a display, a speaker, and/or one or more light-emitting diodes. The communication component 460 enables the device 400 to communicate with other devices, such as via a wired connection and/or a wireless connection. For example, the communication component 460 may include a receiver, a transmitter, a transceiver, a modem, a network interface card, an antenna, and/or the like.

The device 400 may perform one or more processes described herein. For example, a non-transitory computer-readable medium (e.g., the memory 430) may store a set of instructions (e.g., one or more instructions, code, software code, program code, and/or the like) for execution by the processor 420. The processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
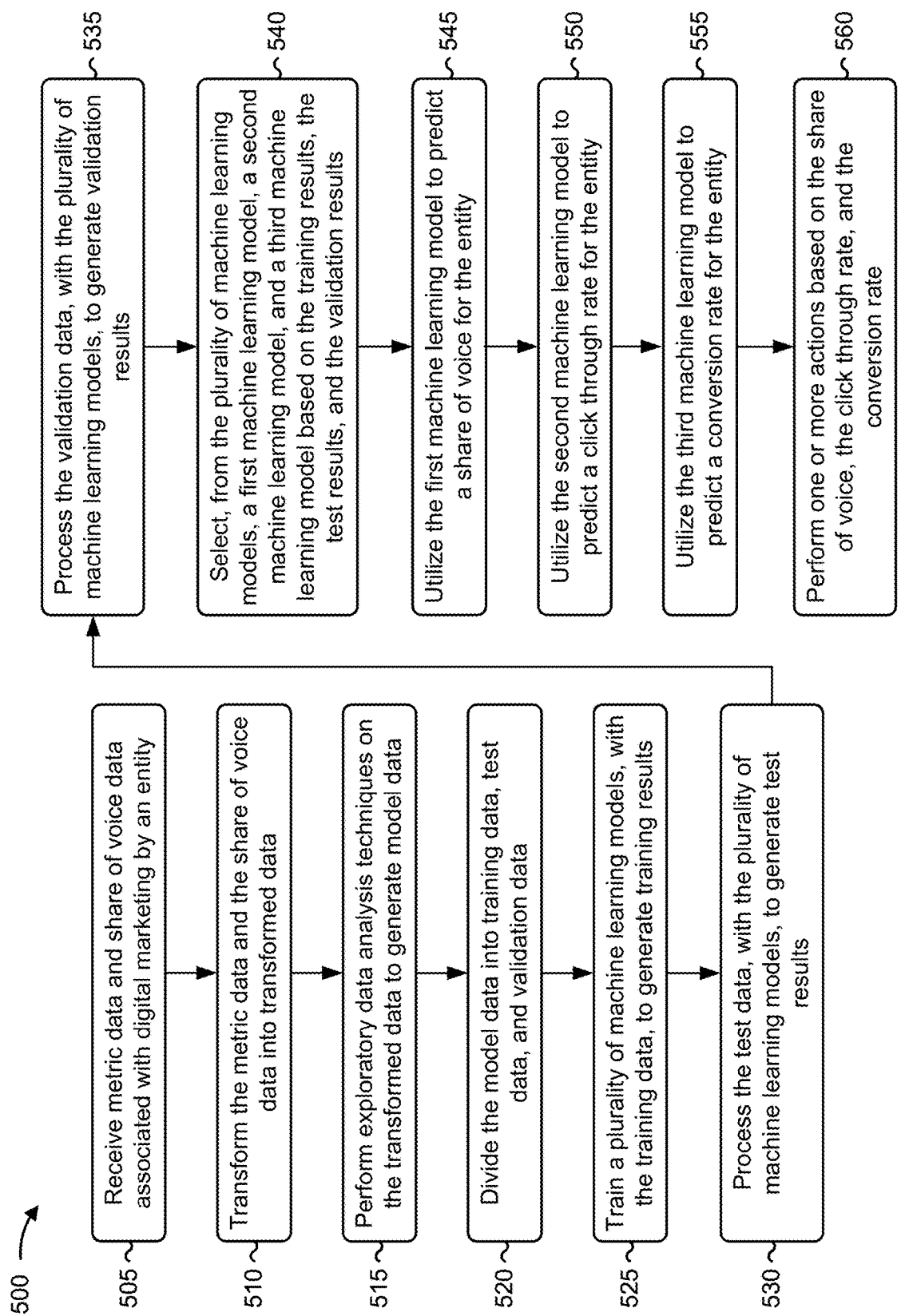
FIG. 5 is a flowchart of an example process for utilizing machine learning models to generate an optimized digital marketing simulation.

FIG. 5 is a flowchart of an example process 500 for utilizing machine learning models to generate an optimized digital marketing simulation. In some implementations, one or more process blocks of FIG. 5 may be performed by a device (e.g., the marketing simulator system 301). In some implementations, one or more process blocks of FIG. 5 may be performed by another device or a group of devices separate from or including the device, such as a user device (e.g., the user device 330). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving metric data and share of voice data associated with digital marketing by an entity (block 505). For example, the device may receive metric data and share of voice data associated with digital marketing by an entity, as described above. In some implementations, the metric data includes data identifying one or more of a campaign name, a brand, a brand form, a keyword search type, whether the brand is stated while performing a search, a retailer, a proxy keyword, a time period of a search, a date on which a search is performed, an average cost per click value, a cost incurred while performing a click, a quantity of impressions published by a retailer, a quantity of clicks made by a user, a quantity of units sold, total sales incurred while making a purchase, or a return on advertising spent. In some implementations, the share of voice data includes data identifying one or more of a manufacturer of a product, a brand name, a sub brand name, a keyword was used while performing a search, a retailer on which a search is performed, a week in which a share of voice is calculated, or a share of voice metric for a different brand, retailer, keyword.

As further shown in FIG. 5, process 500 may include transforming the metric data and the share of voice data into transformed data (block 510). For example, the device may transform the metric data and the share of voice data into transformed data, as described above. In some implementations, transforming the metric data and the share of voice data into the transformed data includes performing a data cleaning technique on the metric data and the share of voice data to generate clean data, performing a feature extraction technique on the metric data and the share of voice data to generate feature data, and performing a scaling technique on the metric data and the share of voice data to generate scaled data, wherein the clean data, the feature data, and the scaled data correspond to the transformed data.

As further shown in FIG. 5, process 500 may include performing exploratory data analysis techniques on the transformed data to generate model data (block 515). For example, the device may perform exploratory data analysis techniques on the transformed data to generate model data, as described above. In some implementations, performing the exploratory data analysis techniques on the transformed data to generate the model data includes performing a univariate and bivariate analysis technique on the transformed data to generate a first portion of the model data, performing a hypothesis testing technique on the transformed data to generate a second portion of the model data, and performing a correlation analysis technique on the transformed data to generate a third portion of the model data.

As further shown in FIG. 5, process 500 may include dividing the model data into training data, test data, and validation data (block 520). For example, the device may divide the model data into training data, test data, and validation data, as described above.

As further shown in FIG. 5, process 500 may include training a plurality of machine learning models, with the training data, to generate training results (block 525). For example, the device may train a plurality of machine learning models, with the training data, to generate training results, as described above. In some implementations, the plurality of machine learning models includes one or more of a random forest machine learning model, an extreme gradient boosting regressor machine learning model, a prophet machine learning model, a linear regression machine learning model, a gradient boost machine learning model, an adaptive boosting regressor machine learning model, or a k-nearest neighbors machine learning model.

As further shown in FIG. 5, process 500 may include processing the test data, with the plurality of machine learning models, to generate test results (block 530). For example, the device may process the test data, with the plurality of machine learning models, to generate test results, as described above. In some implementations, processing the test data, with the plurality of machine learning models, to generate the test results includes generating predictions based on the processing the test data with the plurality of machine learning models, and comparing the predictions to expected values to generate the test results. In some implementations, processing the test data, with the plurality of machine learning models, to generate the test results includes utilizing different portions of the test data to test and train the plurality of machine learning models on different iterations, and generating the test results based on utilizing the different portions of the test data to test and train the plurality of machine learning models on the different iterations.

As further shown in FIG. 5, process 500 may include processing the validation data, with the plurality of machine learning models, to generate validation results (block 535). For example, the device may process the validation data, with the plurality of machine learning models, to generate validation results, as described above. In some implementations, processing the validation data, with the plurality of machine learning models, to generate the validation results includes utilizing a k-fold cross-validation technique or a walk forward validation technique to generate the validation results. In some implementations, processing the validation data, with the plurality of machine learning models, to generate the validation results includes processing the validation data, with the plurality of machine learning models, to calculate root mean square errors, processing the validation data, with the plurality of machine learning models, to calculate R-squared values, and processing the validation data, with the plurality of machine learning models, to calculate mean absolute percentage errors, wherein the root mean square errors, the R-squared values, and the mean absolute percentage errors correspond to the validation results.

As further shown in FIG. 5, process 500 may include selecting, from the plurality of machine learning models, a first machine learning model, a second machine learning model, and a third machine learning model based on the training results, the test results, and the validation results (block 540). For example, the device may select, from the plurality of machine learning models, a first machine learning model, a second machine learning model, and a third machine learning model based on the training results, the test results, and the validation results, as described above. In some implementations, selecting, from the plurality of machine learning models, the first machine learning model, the second machine learning model, and the third machine learning model includes selecting, as the first machine learning model, a best fit one of the plurality of machine learning models to predict the share of voice for the entity; selecting, as the second machine learning model, a best fit one of the plurality of machine learning models to predict the click through rate for the entity; and selecting, as the third machine learning model, a best fit one of the plurality of machine learning models to predict the conversion rate for the entity.

As further shown in FIG. 5, process 500 may include utilizing the first machine learning model to predict a share of voice for the entity (block 545). For example, the device may utilize the first machine learning model to predict a share of voice for the entity, as described above.

As further shown in FIG. 5, process 500 may include utilizing the second machine learning model to predict a click through rate for the entity (block 550). For example, the device may utilize the second machine learning model to predict a click through rate for the entity, as described above.

As further shown in FIG. 5, process 500 may include utilizing the third machine learning model to predict a conversion rate for the entity (block 555). For example, the device may utilize the third machine learning model to predict a conversion rate for the entity, as described above.

As further shown in FIG. 5, process 500 may include performing one or more actions based on the share of voice, the click through rate, and the conversion rate (block 560). For example, the device may perform one or more actions based on the share of voice, the click through rate, and the conversion rate, as described above. In some implementations, performing the one or more actions includes one or more of providing a sales report for the entity based on the share of voice, the click through rate, and the conversion rate; providing a simulation for the entity based on the share of voice, the click through rate, and the conversion rate; providing a recommended spending plan for digital marketing for the entity based on the share of voice, the click through rate, and the conversion rate; providing a recommended digital marketing strategy for the entity based on the share of voice, the click through rate, and the conversion rate; or retraining one or more of the first machine learning model, the second machine learning model, or the third machine learning model based on one or more of the share of voice, the click through rate, and the conversion rate.

In some implementations, performing the one or more actions includes receiving feedback about one or more of the share of voice, the click through rate, or the conversion rate, and modifying one or more of the first machine learning model, the second machine learning model, or the third machine learning model based on the feedback.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device, metric data and share of voice data associated with digital marketing by an entity;
transforming, by the device, the metric data and the share of voice data into transformed data;
performing, by the device, exploratory data analysis techniques on the transformed data to generate model data;
dividing, by the device, the model data into training data, test data, and validation data;
training, by the device, a plurality of machine learning models, with the training data, to generate training results;
processing, by the device, the test data, with the plurality of machine learning models, to generate test results;
processing, by the device, the validation data, with the plurality of machine learning models, to calculate root mean square errors;
processing, by the device, the validation data, with the plurality of machine learning models, to calculate R-squared values;
processing, by the device, the validation data, with the plurality of machine learning models, to calculate mean absolute percentage errors,
wherein the root mean square errors, the R-squared values, and the mean absolute percentage errors correspond to validation results;
selecting, by the device and from the plurality of machine learning models, a first machine learning model, a second machine learning model, and a third machine learning model based on the training results, the test results, and the validation results;
utilizing, by the device, the first machine learning model to predict a share of voice for the entity;
utilizing, by the device, the second machine learning model to predict a click through rate for the entity;
utilizing, by the device, the third machine learning model to predict a conversion rate for the entity; and
performing, by the device, one or more actions based on the share of voice, the click through rate, and the conversion rate.

2. The method of claim 1, wherein the metric data includes data identifying one or more of:
a campaign name,
a brand,
a brand form,
a keyword search type,
whether the brand is stated while performing a search,
a retailer,
a proxy keyword,
a time period of a search,
a date on which a search is performed,
an average cost per click value,
a cost incurred while performing a click, a quantity of impressions published by a retailer,
a quantity of clicks made by a user,
a quantity of units sold,
total sales incurred while making a purchase, or
a return on advertising spent.

3. The method of claim 1, wherein the share of voice data includes data identifying one or more of:
a manufacturer of a product,
a brand name,
a sub brand name,
a keyword was used while performing a search,
a retailer on which a search is performed,
a week in which a share of voice is calculated, or
a share of voice metric for a different brand, retailer, or keyword.

4. The method of claim 1, wherein transforming the metric data and the share of voice data into the transformed data comprises:
performing a data cleaning technique on the metric data and the share of voice data to generate clean data;
performing a feature extraction technique on the metric data and the share of voice data to generate feature data; and
performing a scaling technique on the metric data and the share of voice data to generate scaled data,
wherein the clean data, the feature data, and the scaled data correspond to the transformed data.

5. The method of claim 1, wherein performing the exploratory data analysis techniques on the transformed data to generate the model data comprises:
performing a univariate and bivariate analysis technique on the transformed data to generate a first portion of the model data;
performing a hypothesis testing technique on the transformed data to generate a second portion of the model data; and
performing a correlation analysis technique on the transformed data to generate a third portion of the model data.

6. The method of claim 1, wherein the plurality of machine learning models includes one or more of:
a random forest machine learning model,
an extreme gradient boosting regressor machine learning model,
a prophet machine learning model,
a linear regression machine learning model,
a gradient boost machine learning model,
an adaptive boosting regressor machine learning model, or
a k-nearest neighbors machine learning model.

7. The method of claim 1, wherein processing the test data, with the plurality of machine learning models, to generate the test results comprises:
generating predictions based on the processing the test data with the plurality of machine learning models; and
comparing the predictions to expected values to generate the test results.

8. A device, comprising:
one or more memories; and
one or more processors, coupled to the one or more memories, configured to:
receive metric data and share of voice data associated with digital marketing by an entity;
utilize a data cleaning technique, a feature extraction technique, and a scaling technique to transform the metric data and the share of voice data into transformed data;
perform exploratory data analysis techniques on the transformed data to generate model data,
wherein a first portion of the model data is generated based on a univariate and bivariate analysis technique,
wherein a second portion of the model data is generated based on a hypothesis testing technique, and
wherein a third portion of the model data is generated based on a correlation analysis technique;
divide the model data into training data, test data, and validation data;
train a plurality of machine learning models, with the training data, to generate training results;
process the test data, with the plurality of machine learning models, to generate test results;
process the validation data, with the plurality of machine learning models, to generate validation results;
select, from the plurality of machine learning models, a first machine learning model, a second machine learning model, and a third machine learning model based on the training results, the test results, and the validation results;
utilize the first machine learning model to predict a share of voice for the entity;
utilize the second machine learning model to predict a click through rate for the entity;
utilize the third machine learning model to predict a conversion rate for the entity; and
perform one or more actions based on the share of voice, the click through rate, and the conversion rate.

9. The device of claim 8, wherein the one or more processors, to process the test data, with the plurality of machine learning models, to generate the test results, to generate the test results, are configured to:
utilize different portions of the test data to test and train the plurality of machine learning models on different iterations; and
generate the test results based on utilizing the different portions of the test data to test and train the plurality of machine learning models on the different iterations.

10. The device of claim 8, wherein the one or more processors, to process the validation data, with the plurality of machine learning models, to generate the validation results, are configured to:
utilize a k-fold cross-validation technique or a walk forward validation technique to generate the validation results.

11. The device of claim 8, wherein the one or more processors, to process the validation data, with the plurality of machine learning models, to generate the validation results, are configured to:
process the validation data, with the plurality of machine learning models, to calculate root mean square errors;
process the validation data, with the plurality of machine learning models, to calculate R-squared values; and
process the validation data, with the plurality of machine learning models, to calculate mean absolute percentage errors,
wherein the root mean square errors, the R-squared values, and the mean absolute percentage errors correspond to the validation results.

12. The device of claim 8, wherein the one or more processors, to select, from the plurality of machine learning models, the first machine learning model, the second machine learning model, and the third machine learning model, are configured to:
- select, as the first machine learning model, a best fit one of the plurality of machine learning models to predict the share of voice for the entity;
- select, as the second machine learning model, a best fit one of the plurality of machine learning models to predict the click through rate for the entity; and
- select, as the third machine learning model, a best fit one of the plurality of machine learning models to predict the conversion rate for the entity.

13. The device of claim 8, wherein the one or more processors, to perform the one or more actions, are configured to one or more of:
- provide a sales report for the entity based on the share of voice, the click through rate, and the conversion rate;
- provide a simulation for the entity based on the share of voice, the click through rate, and the conversion rate;
- provide a recommended spending plan for digital marketing for the entity based on the share of voice, the click through rate, and the conversion rate;
- provide a recommended digital marketing strategy for the entity based on the share of voice, the click through rate, and the conversion rate; or
- retrain one or more of the first machine learning model, the second machine learning model, or the third machine learning model based on one or more of the share of voice, the click through rate, and the conversion rate.

14. The device of claim 8, wherein the one or more processors, to perform the one or more actions, are configured to:
- receive feedback about one or more of the share of voice, the click through rate, or the conversion rate; and
- modify one or more of the first machine learning model, the second machine learning model, or the third machine learning model based on the feedback.

15. A non-transitory computer-readable medium storing a set of instructions, the set of instructions comprising:
- one or more instructions that, when executed by one or more processors of a device, cause the device to:
  - receive metric data and share of voice data associated with digital marketing by an entity;
  - transform the metric data and the share of voice data into transformed data;
  - perform a univariate and bivariate analysis technique on the transformed data to generate a first portion of model data;
  - perform a hypothesis testing technique on the transformed data to generate a second portion of model data;
  - perform a correlation analysis technique on the transformed data to generate a third portion of the model data;
  - divide the model data into training data, test data, and validation data;
  - train a plurality of machine learning models, with the training data, to generate training results;
  - process the test data, with the plurality of machine learning models, to generate test results;
  - process the validation data, with the plurality of machine learning models, to generate validation results;
  - select, from the plurality of machine learning models, a first machine learning model, a second machine learning model, and a third machine learning model based on the training results, the test results, and the validation results;
  - utilize the first machine learning model to predict a share of voice for the entity;
  - utilize the second machine learning model to predict a click through rate for the entity; and
  - utilize the third machine learning model to predict a conversion rate for the entity;
  - perform one or more actions based on the share of voice, the click through rate, and the conversion rate.

16. The non-transitory computer-readable medium of claim 15, wherein the one or more instructions, that cause the device to transform the metric data and the share of voice data into the transformed data, cause the device to:
- perform a data cleaning technique on the metric data and the share of voice data to generate clean data;
- perform a feature extraction technique on the metric data and the share of voice data to generate feature data; and
- perform a scaling technique on the metric data and the share of voice data to generate scaled data,
  - wherein the clean data, the feature data, and the scaled data correspond to the transformed data.

17. The non-transitory computer-readable medium of claim 15, wherein the one or more instructions, that cause the device to process the test data, with the plurality of machine learning models, to generate the test results, cause the device to:
- generate predictions based on the processing the test data with the plurality of machine learning models; and
- compare the predictions to expected values to generate the test results.

18. The non-transitory computer-readable medium of claim 15, wherein the one or more instructions, that cause the device to process the test data, with the plurality of machine learning models, to generate the test results, cause the device to:
- utilize different portions of the test data to test and train the plurality of machine learning models on different iterations; and
- generate the test results based on utilizing the different portions of the test data to test and train the plurality of machine learning models on the different iterations.

19. The non-transitory computer-readable medium of claim 15, wherein the one or more instructions, that cause the device to process the validation data, with the plurality of machine learning models, to generate the validation results, cause the device to:
- utilize a k-fold cross-validation technique or a walk forward validation technique to generate the validation results.

20. The non-transitory computer-readable medium of claim 15, wherein the one or more instructions, that cause the device to process the validation data, with the plurality of machine learning models, to generate the validation results, cause the device to:
- process the validation data, with the plurality of machine learning models, to calculate root mean square errors;
- process the validation data, with the plurality of machine learning models, to calculate R-squared values; and
- process the validation data, with the plurality of machine learning models, to calculate mean absolute percentage errors,
  - wherein the root mean square errors, the R-squared values, and the mean absolute percentage errors correspond to the validation results.

* * * * *